(12) United States Patent
Knudson et al.

(10) Patent No.: US 10,057,653 B2
(45) Date of Patent: Aug. 21, 2018

(54) PROGRAM GUIDE SYSTEM WITH REAL-TIME DATA SOURCES

(71) Applicant: Rovi Guides, Inc., San Carlos, CA (US)

(72) Inventors: Edward B. Knudson, Lakewood, CO (US); David M. Rudnick, Denver, CO (US); Michael D. Ellis, Boulder, CO (US); Daniel C. Hagenbuch, Holland, PA (US); Joel G. Hassell, Golden, CO (US); Robert A. Knee, Lansdale, PA (US); Steven J. Reynolds, Littleton, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/352,297

(22) Filed: Nov. 15, 2016

(65) Prior Publication Data

US 2017/0127143 A1 May 4, 2017

Related U.S. Application Data

(63) Continuation of application No. 14/949,630, filed on Nov. 23, 2015, now Pat. No. 9,525,919, which is a continuation of application No. 14/049,804, filed on Oct. 9, 2013, now Pat. No. 9,344,768, which is a continuation of application No. 12/115,091, filed on
(Continued)

(51) Int. Cl.
| | | |
|---|---|---|
| *H04N 21/482* | (2011.01) | |
| *H04N 21/488* | (2011.01) | |
| *H04N 21/266* | (2011.01) | |
| *H04N 21/231* | (2011.01) | |
| *H04N 21/81* | (2011.01) | |
| *H04N 21/472* | (2011.01) | |

(52) U.S. Cl.
CPC ... *H04N 21/4886* (2013.01); *H04N 21/23113* (2013.01); *H04N 21/26613* (2013.01); *H04N 21/47202* (2013.01); *H04N 21/4821* (2013.01); *H04N 21/8126* (2013.01)

(58) Field of Classification Search
CPC combination set(s) only.
See application file for complete search history.

(56) References Cited

U.S. PATENT DOCUMENTS 5,982,891 A * 11/1999 Ginter .............. G06F 21/10
348/E5.006
6,539,548 B1 * 3/2003 Hendricks .......... H04H 20/42
348/E5.002

* cited by examiner

*Primary Examiner* — Kieu Oanh T Bui
(74) *Attorney, Agent, or Firm* — Haley Guiliano LLP

(57) ABSTRACT

A program guide system in which an interactive television program guide is implemented at least partially on user television equipment receives program listings data and real-time data such as sports scores, news data, etc. The real-time data may be stored in a database maintained by the program guide, so that the program guide may access the stored real-time data at a later time. Updated program listings information may be provided to the program guide as part of the data stream in which the real-time data is provided. Unique keys may be generated for the program listings data and real-time data associated with each live event. The keys may be compared at the program guide to determine which program listings correspond to which items of real-time data. Different types of real-time data may be assigned different expiration times. When data has expired it may be removed from the database.

17 Claims, 30 Drawing Sheets

Related U.S. Application Data

May 5, 2008, now Pat. No. 8,589,976, which is a continuation of application No. 10/307,004, filed on Nov. 26, 2002, now Pat. No. 7,386,871, which is a continuation of application No. 09/229,047, filed on Jan. 12, 1999, now Pat. No. 6,536,041.

(60) Provisional application No. 60/089,486, filed on Jun. 16, 1998.

| DATA TYPE | EXPIRATION TIME |
|---|---|
| GAME PREVIEW | GAME START TIME + 15 MINUTES |
| GAME RECAP | ROLLOVER TIME |
| SCORE UPDATE | UPDATE TIME + 10 MINUTES |
| EVENT UPDATE | UPDATE TIME + 30 MINUTES |
| LEAGUE SCORES | ROLLOVER TIME |
| LEAGUE SCHEDULES | VARIABLE - BASED ON SPORT, EXTENT OF SCHEDULE |
| TEAM NOTES | 7 DAYS |
| ALL OTHERS | UPDATE TIME + 5 MINUTES |

FIG. 20

PROGRAM GUIDE SYSTEM WITH REAL-TIME DATA SOURCES

This application is a continuation of U.S. patent application Ser. No. 14/949,630, filed Nov. 23, 2015 (allowed), which is a continuation of U.S. patent application Ser. No. 14/049,804, filed Oct. 9, 2013, now U.S. Pat. No. 9,344,768, which is a continuation of U.S. patent application Ser. No. 12/115,091, filed May 5, 2008, now U.S. Pat. No. 8,589,976, which is a continuation of U.S. patent application Ser. No. 10/307,004, filed Nov. 26, 2002, now U.S. Pat. No. 7,386,871, which is a continuation of U.S. patent application Ser. No. 09/229,047, filed Jan. 12, 1999, now U.S. Pat. No. 6,536,041, which claims the benefit under 35 U.S.C. § 119(e) of U.S. provisional application No. 60/089,486, filed Jun. 16, 1998, the disclosure of which are hereby incorporated by reference herein in their entirety.

BACKGROUND OF THE INVENTION

This invention relates to interactive television program guides, and more particularly, to techniques for providing real-time data to supplement the program listings data used in interactive television program guides.

Interactive television program guides allow television users to view television program listings on their televisions. Program guides also allow users to display program listings in various formats, to perform genre-based searches for programs of interest, to order pay-per-view programs, etc. Interactive program guides are typically implemented on microprocessor-based set-top boxes. Program listings data is transmitted to the set-top boxes from a centralized data distribution facility via the user's cable system headend. The program listings data is typically stored in a database in the set-top box, where it may be accessed by the interactive program guide.

Much of the program listings information displayed on the user's television is fairly static. The titles and scheduled broadcast times for most television programs do not change once they have been established. However, some of the information that may be presented in the program guide may be dynamic. For example, sports scores may be presented in the program guide next to the program titles for certain sports events. This type of information changes frequently. If real-time data on sports scores is provided to the program guide, the guide may continually display up-to-the-minute scores with the program listings in real time. Data services that use real-time information such as news services may also be provided. A program guide system that provides some of these real-time data services is described in U.S. Pat. No. 5,589,892. Although the system of the '892 patent is in many respects satisfactory, it would be desirable to be able to provide a program guide system with a number of improvements.

In view of the foregoing, it is an object of the present invention to provide a program guide system that allows real-time data such as sports scores to be stored in the database maintained on the user's set-top box or other suitable program guide platform. At a later time (e.g., after the conclusion of a sporting event), the scores may be retrieved and displayed by the program guide.

It is also an object of the present invention to provide a program guide system that allows updated program listings information to be provided using the same data path as the real-time data.

It is also an object of the present invention to provide a program guide system in which unique keys may be generated to facilitate the matching of real-time data entries and the program listings with which they are associated.

It is also an object of the present invention to provide a program guide system that displays a controllable ticker containing real-time information on the user's display screen on top of a television program.

It is also an object of the present invention to provide a program guide system in which real-time data is stored by the program guide in a database and in which different expiration times may be established for different types of stored real-time data.

SUMMARY OF THE INVENTION

These and other objects of the invention are accomplished in accordance with the principles of the present invention by providing an interactive television program guide system in which an interactive television program guide is implemented on user television equipment or other suitable platform such as a client-server based arrangement. In a client-server arrangement, the program guide is partially implemented on a server and partially implemented on a client. Server functions may be performed by the portion of the program guide that is implemented on a central server and client functions may be performed by the portion of the program guide that is implemented on the user television equipment. The user television equipment may be based on a set-top box or other suitable platform and may contain a videocassette recorder for recording television programs and a television.

A main facility contains a program guide database in which program listings data is stored. The program listings data contains program titles, broadcast times, and other suitable television program schedule information that may be displayed for the user by the program guide. The program listings data is distributed to multiple television distribution facilities, each of which distributes the program listings data to the user television equipment of multiple users.

A source of real-time data, which may be either one or more real-time data sources or a real-time data collection facility that receives data from real-time data sources provides real-time data to the television distribution facilities. The real-time data may contain sports scores for games in progress, current news, current financial or weather information, etc. Each television distribution facility may distribute the real-time data to the program guides associated with that television distribution facility.

The program listings data and the real-time data may be stored in a database maintained by the program guide. The database may be located on the user television equipment, on a server on which at least part of the program guide is implemented, or a combination of such locations or other suitable location. If desired, the program guide may access the stored real-time data after the conclusion of a live event with which the data was originally associated.

Updated program schedule information may be provided to the program guide implemented on the user television equipment or other platform as part of the real-time data stream from the source of real-time data. This data distribution path is particularly suitable for program listings updates of the type that might naturally occur at the source of real-time data. For example, if the scheduled time for a game changes due to a weather delay, information concerning the delay may be most readily obtained at the source of real-time data. Because the game delay affects the scheduled broadcast time of that game, the game delay is of the type of program listings data that may be provided to the program guide as part of the real-time data stream.

In order to match each item of real-time data for a live event with the corresponding program listings data for that event, a key generator is used at both the main facility and the source of real-time data. The key generator at the main facility generates a unique key for each program listing based on attributes of the program listing such as start date, start time, category of event, etc. The key generator at the source of real-time data generates a unique key for each item of real-time data associated with an event using the same algorithm as the key generator at the main facility. The keys that are generated at the main facility are distributed to the program guide implemented on the user television equipment or other suitable platform with their associated program listings data. Similarly, the keys that are generated at the source of real-time data are distributed to the program guide with their associated real-time data. At the user television equipment or other suitable platform, the keys for the program listings are compared to the keys for the real-time data. Program listings are matched with real-time data based on which keys match.

A controllable ticker may be displayed on the user's television display screen. The controllable ticker contains a user-selectable category and a user-selectable status information item. Illustrative categories that may be selected by the user include different sports or sports leagues, etc. Illustrative status information items that may be selected by the user include games in the selected category. The controllable ticker may be displayed on a user's screen on top of a television program.

The user may use right and left cursor keys or any other suitable user interface to change the category for the controllable ticker. When the user changes the category for the controllable ticker the controllable ticker may display the most recently viewed status information item for that category or the first status information item for that category.

The user may set up preferences for different categories and status information items. For example, the user may set up a favorite category as being the sport "baseball." The user may invoke a favorites mode in which the categories displayed in the controllable ticker are limited to categories that satisfy the user's preferences. The user may also switch between different categories using a special remote control button such as a "favorites" button that directs the controllable ticker to display only categories that satisfy the user's preferences. A television icon may be provided with the status information item when the status information item relates to a television program that is available on the user television equipment. The user may direct the program guide to record programs from the controllable ticker or may direct the program guide to tune to the channel associated with a selected status information item from the controllable ticker. The user may also set reminders from the controllable ticker and may purchase pay television programs from the controllable ticker.

The real-time data stored in the database maintained by the program guide may be periodically purged from the database. The system may assign different expiration times to different types of data. For example, game preview information may be removed from the database 15 minutes after a game starts. Several types of real-time data may be removed from the database at a daily rollover time (e.g., 7:00 AM). Other suitable expiration times may be established to handle data types such as game recaps, score updates, event updates, league scores, league schedules, team notes, etc.

Further features of the invention, its nature and various advantages will be more apparent from the accompanying drawings and the following detailed description of the preferred embodiments.

BRIEF DESCRIPTION OF THE DRAWINGS

FIG. 20 is a table showing illustrative expiration times for different types of real-time data in accordance with the present invention.

DETAILED DESCRIPTION OF THE PREFERRED EMBODIMENTS

Figure 1:
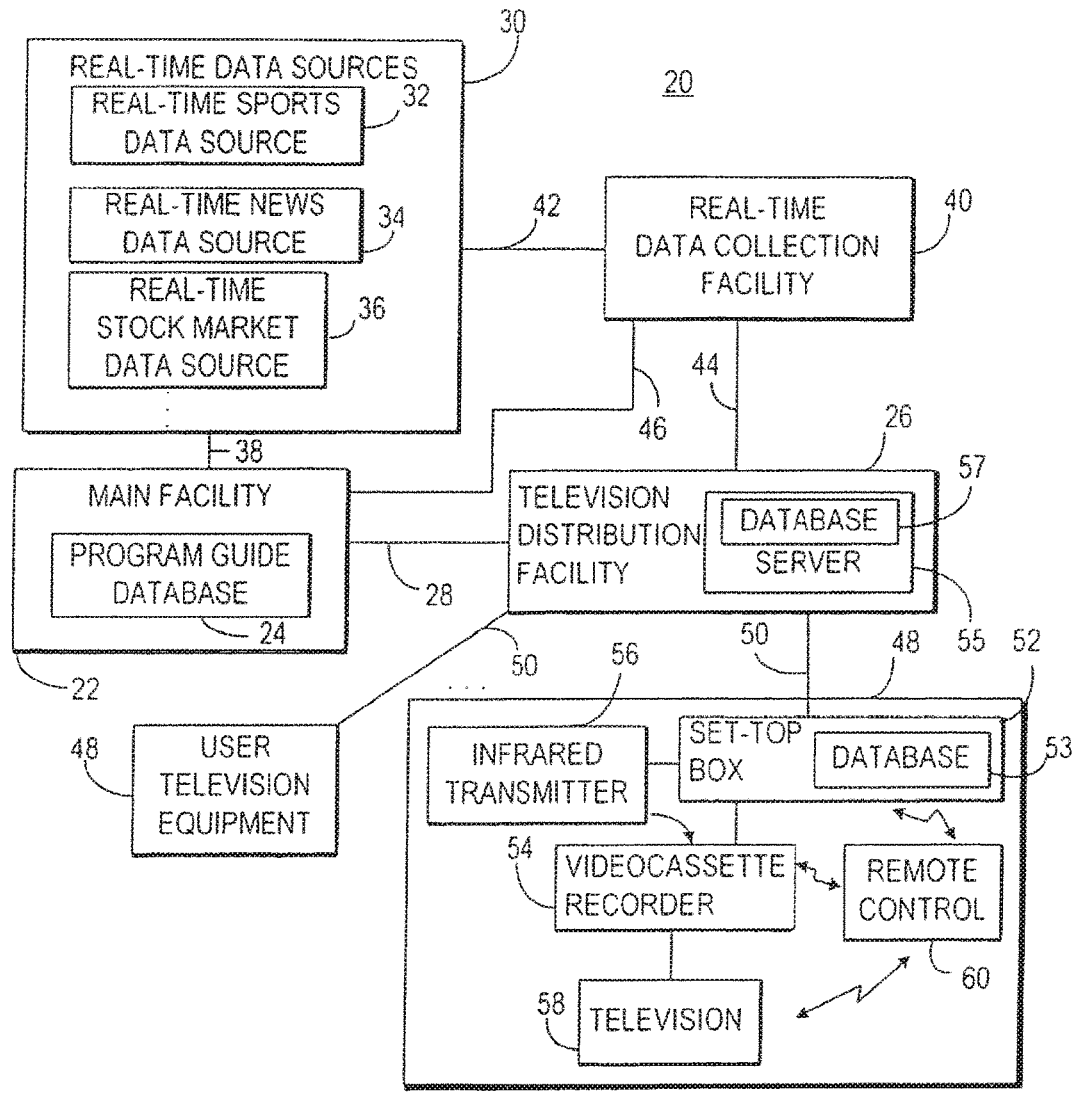
FIG. 1 is a diagram of an illustrative interactive television program guide system in accordance with the present invention.

An illustrative interactive television program guide system 20 in accordance with the present invention is shown in FIG. 1. Main facility 22 contains a program guide database 24 for storing program guide information such as television program guide listings data, pay-per-view ordering information, television program promotional information, etc. The program guide information that is stored in program guide database 24 is typically generated using a fairly involved process in which data is verified and manipulated in various ways prior to storage in database 24. Information from database 24 is preferably transmitted to multiple television distribution facilities such as television distribution facility 26 in parallel via communications links such as communications link 28. Only one such television distribution facility 26 is shown in FIG. 1 to avoid over-complicating the drawing. Each link 28 may be a satellite link, a telephone network link, a cable or fiber-optic link, a microwave link, a combination of such links, or any other suitable communications path. If it is desired to transmit video signals over link 28 in addition to text and graphics data signals, a relatively high bandwidth link such as a satellite link is generally preferable to a relatively low bandwidth link such as a telephone line.

Television distribution facility 26 is a facility for distributing television signals to users, such as a cable system headed, a broadcast distribution facility, or a satellite television distribution facility.

Real-time data sources 30 such as real-time sports score source 32, real-time news data source 34, and real-time stock market data source 36 are used to gather information such as sports scores, stock quotes, and the like from various sporting and news events. Real-time information from real-time data sources 30 may be provided to each of the television distribution facilities 26 by providing this information to main facility 22 via communications path 38 and redistributing the information to television distribution facilities 26 via paths 28. Alternatively (or in addition), real-time information from real-time data sources 30 may be provided directly to television distribution facilities 26 or may be provided to one or more real-time data collection facilities 40 via communications paths such as communications path 42, where the data may be processed for retransmission to television distribution facilities 26 via communications paths such as communications path 44. If desired, data from real-time data collection facility 40 may be provided to television distribution facility 26 via communications path 46, main facility 22, and communications path 28. Communications paths 38, 42, 44, and 46 may be any suitable communications paths such as satellite links, coaxial cable, fiber optics, free-space transmissions, telephone links, or a combination of such links or other suitable links.

The program guide information transmitted by main facility 22 to television distribution facility 26 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc.

The real-time data transmitted to television distribution facility 26 may include current sports scores for games in progress, real-time game statistics, game delay information, game availability information (i.e., information on whether a given game is blocked out or not), real-time stock quotes or other financial information, real-time news, current weather information, or any other suitable real-time data.

Each television distribution facility 26 may distribute both the program guide data received from program guide database 24 and the real-time data received from real-time data sources 30 to the program guides of users at associated user television equipment 48 via communications links 50. User television equipment 48 may be any suitable equipment for providing television to the user that contains sufficient processing capabilities to implement an interactive television program guide. Paths 50 may be cable links, fiber-optic links, satellite links, broadcast or other free-space links, or other suitable link or combination of such links. Any suitable communications scheme may be used to transmit data over paths 50, including in-band transmissions, vertical blanking interval transmissions, out-of-band transmissions, digital transmissions, analog transmissions, cable transmissions, satellite transmissions, over-the-air transmissions, multichannel multipoint distribution services (MMDS) transmissions, etc.

The data distribution technique that is used to distribute data on paths 50 depends on the type of information that is being distributed. For example, text and graphics may be distributed over an out-of-band channel using an out-of-band modulator. Video information may also be distributed in this way, although large quantities of video information may be more efficiently distributed using one or more digital channels on path 50. Such digital channels may also be used for distributing text and graphics. If desired, an interactive television program guide may be implemented using a client-server architecture. In a client-server arrangement, the program guide is partially implemented on a server and partially implemented on a client. The server may be a server such as server 55 at television distribution facility 26. The client may be user television equipment (e.g., set-top boxes). Program guide data and real-time data that are distributed to a client-server program guide at television distribution facility 26 may be stored in a database 57 at television distribution facility 26. For clarity, the present invention is sometimes described primarily in the context of program guides that are implemented on user television equipment, rather than in the context of program guides that are implemented partially on a server and partially on user television equipment.

Each user has a receiver, which is typically a set-top box such as set-top box 52, but which may be other suitable television equipment such as an advanced television receiver into which circuitry similar to set-top-box circuitry has been integrated or a personal computer television (PC/TV). For purposes of illustration, the present invention will be described in the context of user television equipment 48 that uses set-top boxes 52.

Data such as program guide data may be distributed to set-top boxes 52 periodically and stored in database 53. In a client-server architecture, this database need not be maintained on the set-top box. For example, the program guide may maintain a database such as database 57 on a server such as server 55 located at television distribution facility 26 or some other suitable location or locations. In configurations where the program guide resides on set-top boxes 52, television distribution facility 26 may poll set-top boxes 52 periodically for certain information (e.g., pay program account information or information regarding programs that have been purchased and viewed using locally-generated authorization techniques). Real-time data from a source of real-time data such as real-time data sources 30 or real-time data collection facility 40 may be distributed to set-top boxes 52 in real time and may be stored in database 53 if it is desired to access this information at a later point in time (e.g., to provide access to the sports scores for games that have recently concluded).

Main facility 22 preferably contains a processor to handle information distribution tasks. Each set-top box 52 preferably contains a processor to handle tasks associated with implementing the interactive television program guide. Television distribution facility 26 may contain a processor for handling tasks associated with data distribution or for implementing the server functions of a client-server program guide.

Each set-top box 52 is typically connected to an optional videocassette recorder 54 so that selected television programs may be recorded. Set-top box 52 may send commands to videocassette recorder 54 using infrared transmitter 56. Each videocassette recorder 54 is connected to a television 58. To record a program, the interactive television program guide implemented on set-top box 52 tunes set-top box 52 to a particular channel and sends control signals to videocassette recorder 54 using infrared transmitter 56 that direct videocassette recorder 54 to start and stop recording at the appropriate times.

During use of the program guide, television program listings, real-time data, advertisements, and other information may be displayed on television 58. Each set-top box 52, videocassette recorder 54, and television 58 may be controlled by one or more remote controls 60 or any other suitable user input interface such as a wireless keyboard, mouse, trackball, dedicated set of keys, etc. A typical remote control 60 has cursor keys for positioning a highlight region on the program guide screen and an OK or select button for selecting a highlighted item on the screen. Other typical remote control buttons include buttons such as an information button (for requesting additional information on a highlighted listing), a record button (for directing the program guide to record a program for a highlighted listing), channel up and down buttons, volume control buttons, numeric keys, etc.

Communications paths 50 preferably have sufficient bandwidth to allow television distribution facility 26 to distribute television programming, program listings information, real-time data, advertisements, and other information to user television equipment 48. Multiple television and audio channels (analog, digital, or both analog and digital) may be provided to user television equipment 48 via communications paths 50. If desired, some of the data may be distributed to user television equipment 48 by one or more distribution facilities that are separate from television distribution facility 26 using communications paths that are at least partly separate from communications paths 50.

Certain functions, such as pay program purchasing, the purchasing of products or services, and data collection functions, may require that user television equipment 48 transmit data to television distribution facility 26 over communications paths 50. If desired, such data may be transmitted over telephone lines or other separate communications paths. If functions such as these are provided using facilities separate from television distribution facility 26, some of the communications involving user television equipment 48 may be made directly with the separate facilities.

Figure 2:
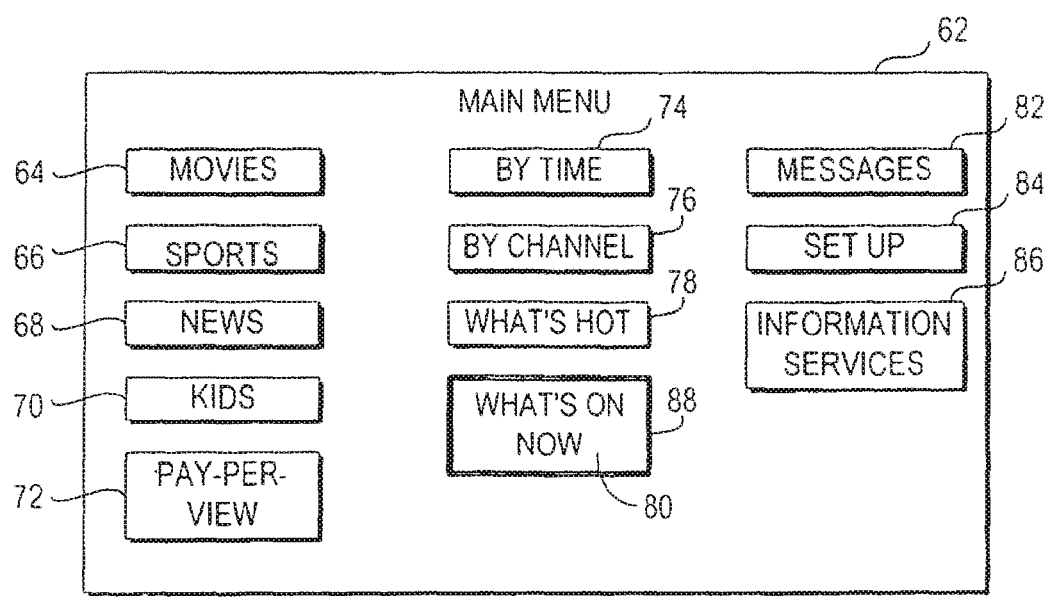
FIG. 2 is an illustrative main menu screen that may be used to provide various program guide options in accordance with the present invention.

An illustrative interactive television program guide main menu screen 62 is shown in FIG. 2. Menu screen 62 may be invoked by the user by pressing a guide button on remote control 60 (FIG. 1). Suitable main menu options on main menu screen 62 provide the user with an opportunity to request television program listings directed towards movies (option 64), sports (option 66), news (option 68), children's programming (option 70), pay-per-view programming (option 72), program listings organized by time (option 74), program listings organized by channel (option 76), currently popular or "hot" programs (option 78), and programs that are currently being aired (option 80). Other main menu options include messages option 82 (for reviewing messages from, e.g., the service provider at television distribution facility 26) and set up option 84 (for setting up certain user-selectable options within the program guide). Information services option 86 may be used to provide the user with various opportunities to view information from real-time data sources 30.

Figure 3:
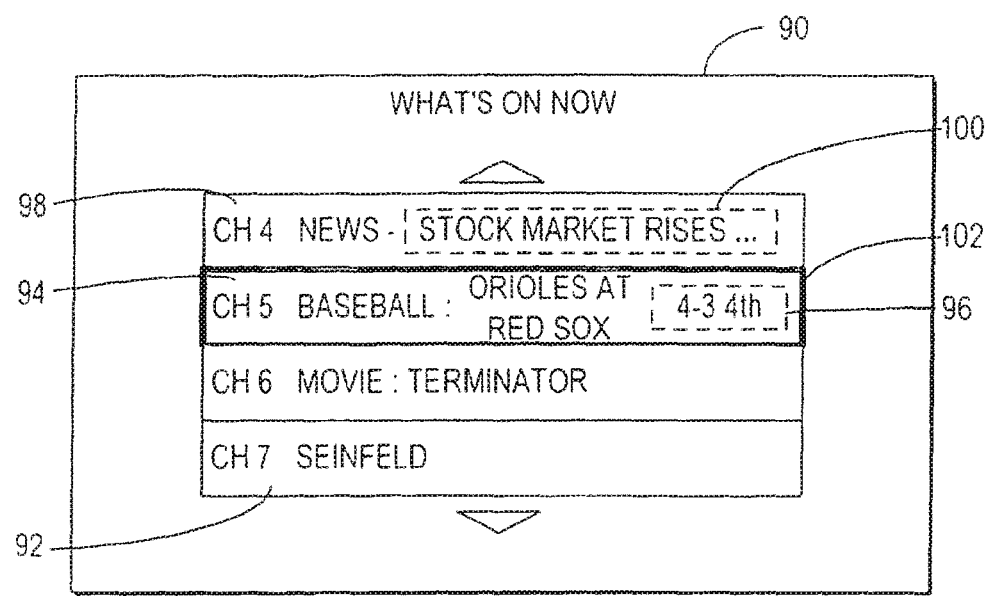
FIG. 3 is an illustrative what's on now program guide screen that may be provided in accordance with the present invention.

If the user selects what's on now option 80 (e.g., by positioning a highlight such as highlight 88 on top of option 80 with remote control cursor keys and by pressing a select button), the program guide may present what's on now screen 90 of FIG. 3. What's on now screen 90 contains conventional program listings such as program listing 92 for the program Seinfeld. Such conventional program listings may contain information on program titles, ratings, channels, scheduled broadcast times, running times, descriptions, critics ratings, etc.

What's on now screen 90 also contains program listings such as program listing 94 that are combined with real-time data 96. In the example of FIG. 3, program listing 94 is for a baseball game that is currently in progress. Real-time data 96 contains information on the current score of that baseball game (4-3) and information on the current inning of the game (the 4th). Program listings information for program listing 94 may be obtained by the program guide from the database maintained by the program guide such as database 53 or database 57. Real-time data such as the sports scores for current sporting events may be obtained directly from a real-time data feed from real-time data sources 30. The data feed may be buffered if necessary, for example, by storing data from the real-time data sources 30 in database 53 or database 57. This allows sports scores and other real-time data to be retrieved rapidly by the program guide when needed. The potential latency period associated with obtaining a desired sports score from a real-time data feed is reduced by storing the real-time data in the database maintained by the program guide (e.g., database 53 or database 57) where it can be accessed almost immediately by the program guide. Storing real-time data in this database also allows sports scores, news, weather, stock quotes, and other such real-time data to be stored for a short period of time, so that the user may access this information with the program guide. As an example, sports scores may be retained even after a given sporting event has concluded, so that the user may be provided with the final score in the program guide. The prices of stocks at the close of the market might also be stored in the database maintained by the program guide, so that this information may be provided to the user by the program guide. Another example of a program listing that is combined with real-time data is program listing 98 (for the news), which is combined with real-time data 100 (text information that the stock market has risen).

As defined herein, "real-time data" refers to data that is communicated essentially in real time from real-time data sources 30. Such data may be buffered at certain points in system 20. "Stored real-time data" refers to data such as final sports scores or closing stock prices, etc. that are stored in the database 53 or 57 that is maintained by the program guide implemented on user television equipment 48 or the equivalent database maintained by the program guide implemented using a client-server architecture.

The examples of combining program listings information and real-time data that are shown in FIG. 3 are illustrative only. Any suitable program listings information may be combined with any suitable real-time data if desired. Moreover, the what's on now screen of FIG. 3 is merely an illustrative type of screen on which such combined information may be presented. Combined program listings and real-time data may be presented in any suitable format within the program guide. If desired, some of the real-time data may be presented without program listings (e.g., by providing various menu options for news information, sports information, weather information, etc. using an option such as information services option 86 of FIG. 2.

Figure 4:
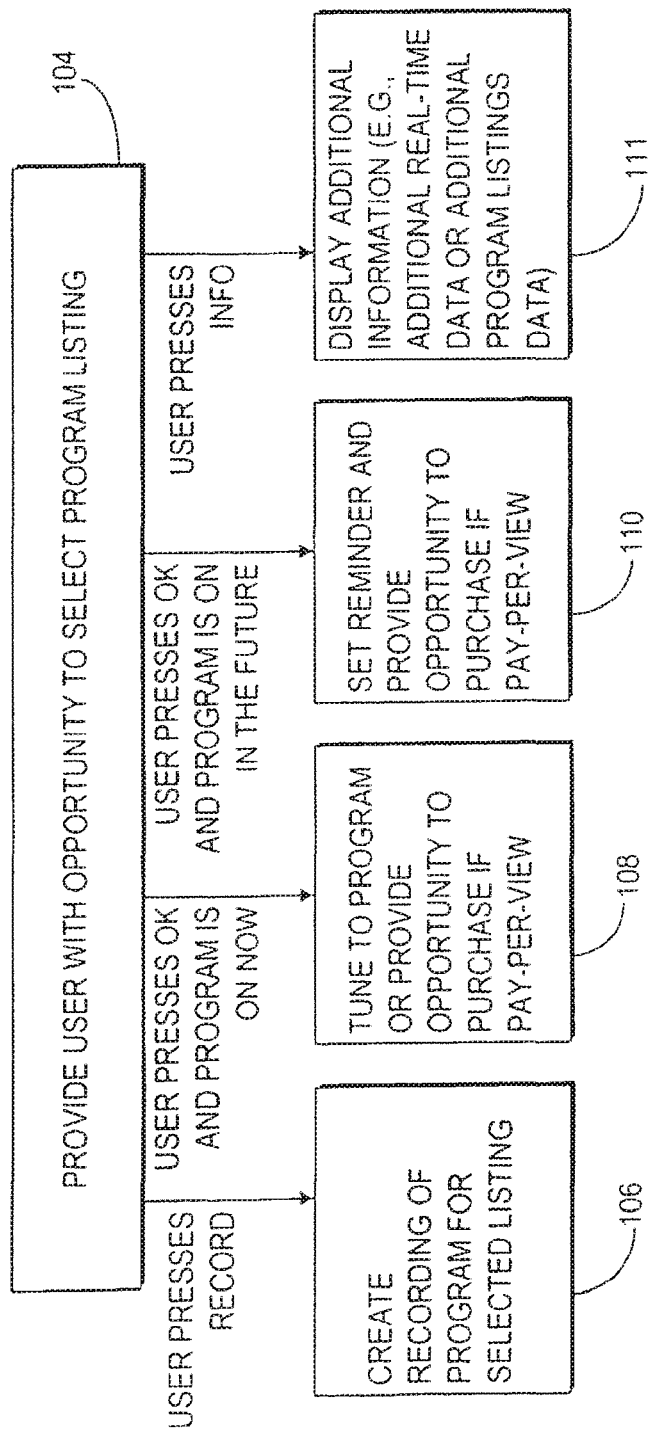
FIG. 4 is a flow chart illustrating steps involved in recording programs, tuning to programs, setting reminders for programs, and purchasing programs in accordance with the present invention.

Program guide listings screens such as screen 90 of FIG. 3 may be used by the user to record programs, to set reminders for programs, to purchase programs or to tune to programs or channels, etc. Illustrative steps involved in performing such functions are shown in FIG. 4. At step 104, the program guide provides the user with an opportunity to select a desired program from the displayed program listings data. For example, the user may be provided with an opportunity to place a highlight region such as highlight region 102 of FIG. 3 on top of a program listing with remote control cursor keys. If a user presses a remote control record button, the program guide creates a recording of the program for the selected program listing at step 106. If the user presses an OK button at step 104 and the desired program is currently being broadcast, the program guide tunes set-top box 52 to the appropriate channel at step 108. If the program is a pay-per-view program, the program guide provides the user with an opportunity to purchase the pay-per-view program at step 110. If the user presses an OK button at step 104 and the desired program is scheduled to be broadcast in the future, the program guide sets a reminder for the program and provides the user with an opportunity to purchase the program if the program is a pay-per-view program at step 110. If the user presses an information or "info" remote control button, the program guide displays additional information such as status information associated with the selected program at step 111. For example, if the selected program is a sports event, the program guide may display information on injuries in the event, game statistics, key plays, etc. The additional information may or may not be stored in the database maintained by the program guide. The additional information may include information provided as part of the real-time data, provided as part of the program listings data, or both.

Figure 5:
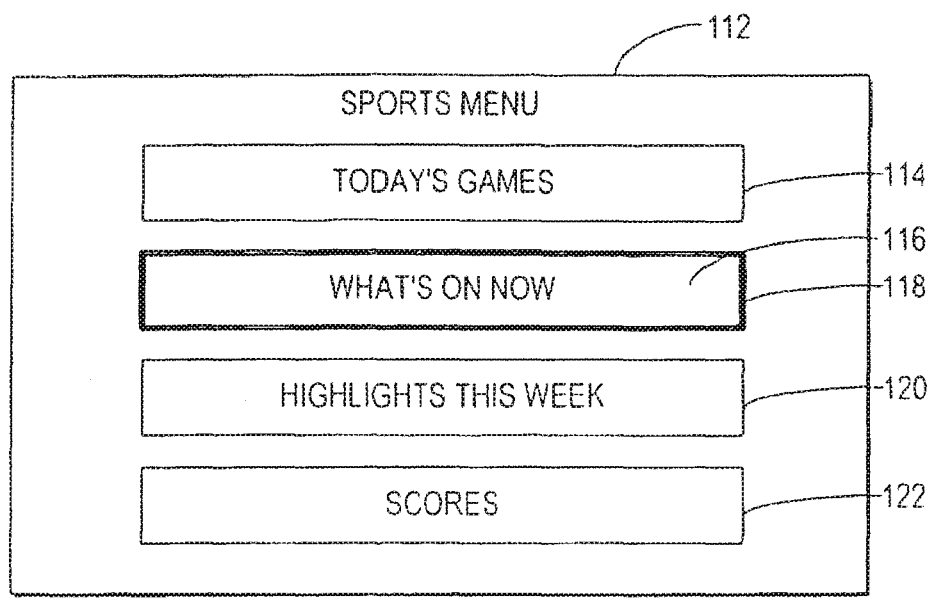
FIG. 5 is an illustrative sports menu program guide screen that may be provided by the program guide in accordance with the present invention.

If desired, the program guide may provide a sports menu such as sports menu 112 of FIG. 5. Sports menu 112 may be reached by selecting sports option 66 of FIG. 2 (i.e., menu 112 may be displayed in place of a list of sports programming) or by selecting a menu item presented to the user upon selecting information services option 86 of FIG. 2 In addition, any other suitable technique may be used for allowing a user to direct the program guide to display sports menu 112.

Sports menu 112 contains today's games option 114 for viewing information on the games that are scheduled to be played that day. What's on now option 116 (shown being selected with highlight region 118) allows the user to view information on the sports events that are currently being broadcast and that are available to the user. Highlights this week option 120 allows the user to view information on sports highlights of the week. Scores option 122 allows the user to view sports scores information, both for games in progress (using data received by the program guide from real-time data sources 30 in real time) and for games that have concluded (using data received by the program guide and stored in the database maintained by the program guide such as database 53 or database 57).

Figure 6:
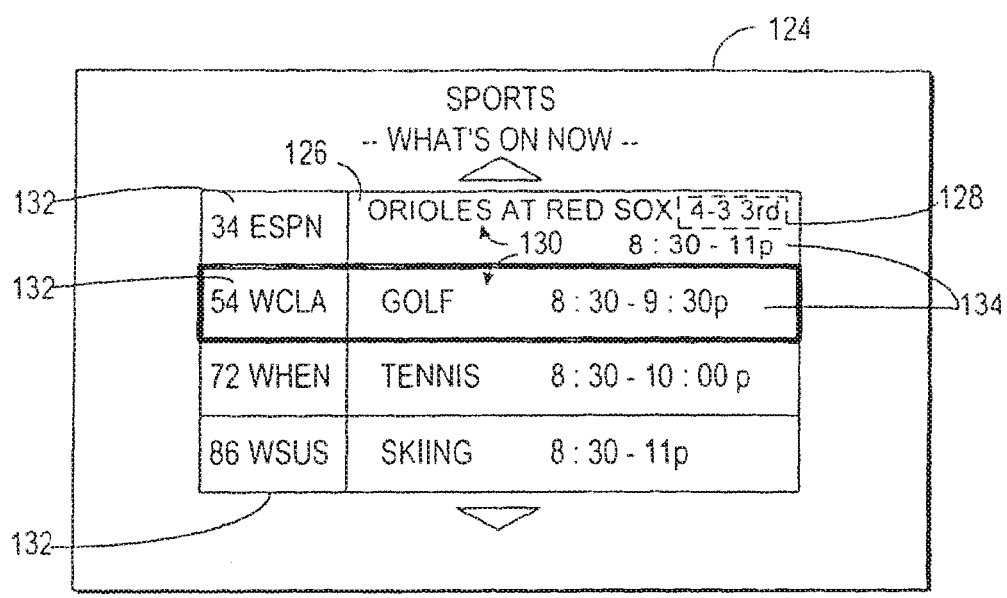
FIG. 6 is an illustrative sports what's on now program guide screen that may be provided by the program guide in accordance with the present invention.

An illustrative sports what's on now screen 124 that may be displayed by the program guide when the user selects option 116 of FIG. 5 is shown in FIG. 6. The category sports is merely illustrative. Any suitable category of television programming (or no specific category) may be used for a what's on now screen. Screen 124 contains a number of program listings that contain real-time data. In particular, program listing 126 is displayed with associated real-time data 128 (the current score and inning for the game of listing 126). Program listings may contain titles 130, channels 132, and scheduled broadcast times 134. The use may access additional program listings by scrolling through the available listings using cursor keys.

Figure 7:
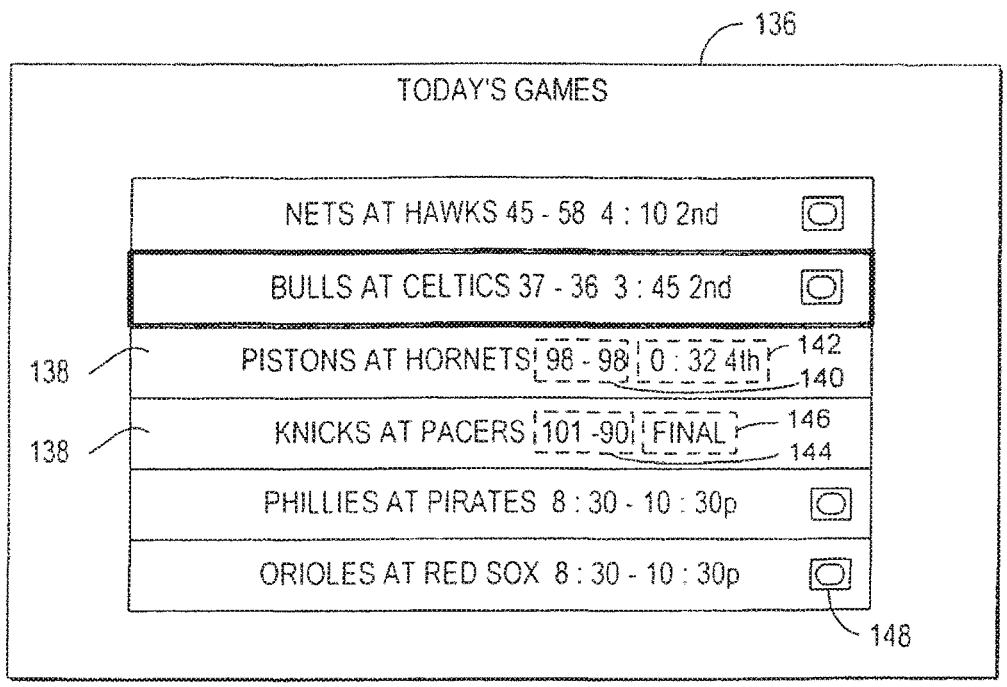
FIG. 7 is an illustrative today's games program guide screen that may be provided by the program guide in accordance with the present invention.

An illustrative today's games screen 136 that may be displayed by the program guide is shown in FIG. 7. Each program listing for a game has a game title 138 (typically the names of the two opponents in the game). Games that are in progress such as the Pistons at Hornets game have a current score 140 and information 142 on the status of the game (e.g., which quarter the game is in, time remaining, etc.). The current score and status information are obtained from real-time data provided by real-time data sources 30 (FIG. 1). The update period for live sporting events depends on the capabilities of the real-time data source, and may be, for example, in the range of several seconds to several minutes. Games that have concluded such as the Knicks at Pacers game contain a final score 144 and an indication 146 that the game is over. Score 144 is an example of the type of stored real-time data that is maintained in database maintained by the program guide so that information on completed games may be made available to the user for at least several hours (and perhaps a day or more) after the game has concluded.

Games that are available to the user to watch on television are indicated by television icon 148. This icon is merely illustrative. If desired, the channel call letters and channel number of those channels that are available to the user might be displayed (as in the arrangement of FIG. 6) to indicate that the game is available on that channel instead of using an icon. Games that are not available on a user's television (e.g., the Pistons at Hornets and Knicks and Pacers games in the example of FIG. 7) are displayed on screens such as today's games screen 136 for inclusiveness and to allow the user to view the score and status information even if the game is not available on television.

Figure 8:
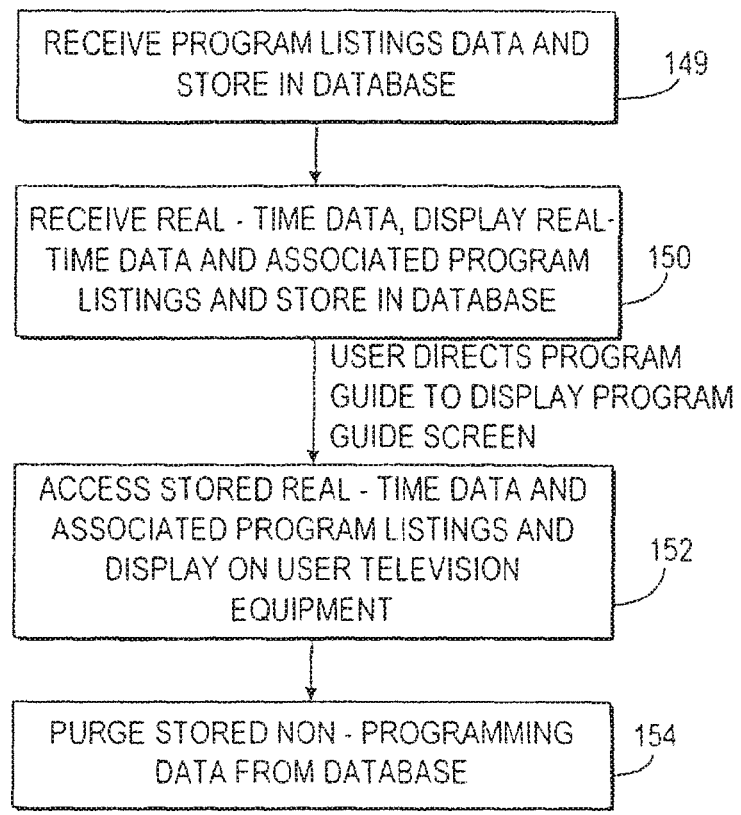
FIG. 8 is a flow chart of steps involved in providing real-time data to the program guide and storing the real-time data in a database on the user television equipment in accordance with the present invention.

Steps involved in providing a program guide screen such as today's games screen 136 of FIG. 7 are shown in FIG. 8. At step 149, program listings information is received by the program guide from main facility 22 (e.g., received by the program guide on the server portion of a client-server guide at television distribution facility 26 or received by the program guide on user television equipment 48 via television distribution facility 26) and stored in the database maintained by the program guide (e.g., database 53 or database 57). Step 149 may be performed continuously, periodically, or on demand, or may be performed using any other suitable technique. At step 150, real-time data such as sports scores data and game status information is received by the program guide (e.g., received by the program guide at television distribution facility 26 or received by the program guide at user television equipment 48 from television distribution facility 26), displayed by the program guide with associated program listings if needed (e.g., on a today's games screen), and stored in the database maintained by the program guide (e.g., database 53 or database 57). When the user desires to view real-time data and program listings, the user may direct the program guide to display a screen such as a today's game screen. The program guide then accesses the stored real-time data and associated program listings in the database maintained by the program guide and displays the stored real-time data with its associated program game title at step 152. Game title information may be stored in the database maintained by the program guide as part of the stored program listings data that is received from main facility 22 at step 149. To properly maintain the database, the program guide purges data in the database that has "expired" (i.e., that has been stored for a certain amount of time and is no longer needed). Although represented as a series of discreet steps, the steps performed by the program guide in FIG. 8 may be performed using concurrent processes and some of the steps may be performed in whole or in part in different orders than illustrated in FIG. 8 if desired.

When real-time data is received (e.g., at step 150 of FIG. 8), the program guide must locate the associated program listings information for that real-time data in the database maintained by the program guide before both the real-time data and the associated program listings are displayed together by the program guide. For example, if the current score for a baseball game is received, the program guide must locate the name of the game, the channel for the game, the start and stop time of the game, etc. from within the database maintained by the program guide.

Figure 9:
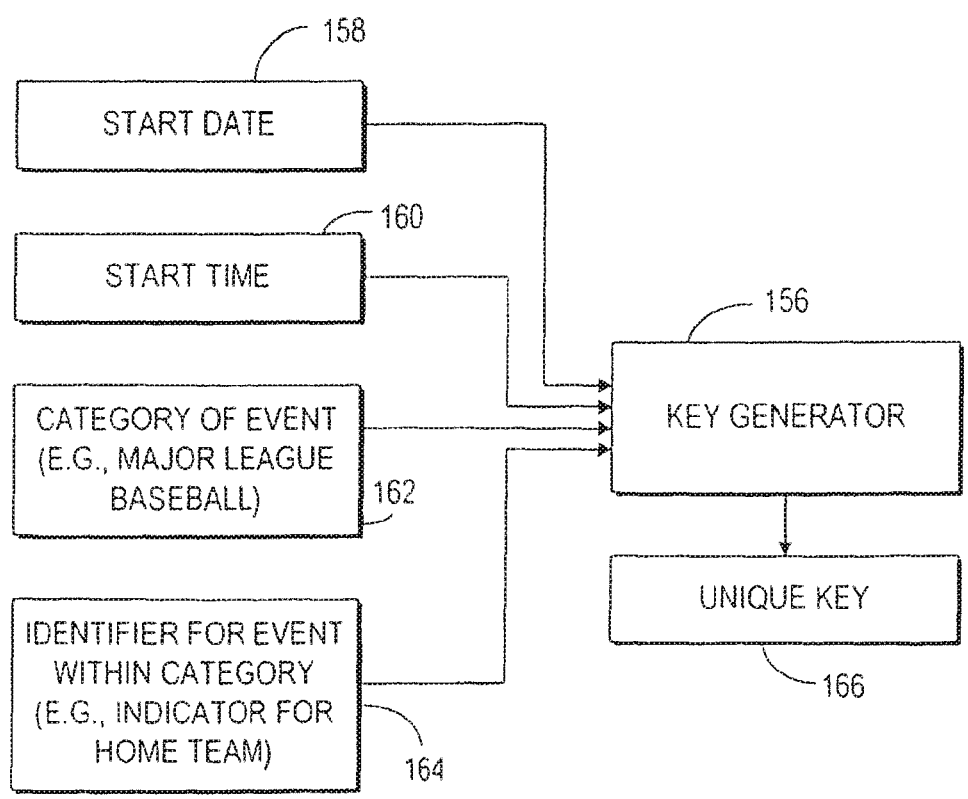
FIG. 9 is a diagram of an illustrative key generator arrangement showing typical key generator inputs in accordance with the present invention.

In order for the program guide to be able to determine which program listing is associated with a given item of real-time data, an identical key generator is used at both main facility 24 and at the source of real-time data (i.e., at real-time data sources 30 or at real-time data collection facility 40). As shown in FIG. 9, each key generator 156 may receive information on a live event's start date 158, start time 160, category of event 162 (e.g., major league baseball, hockey, National Football League football, etc.), identifier for event within category 164 (e.g., an indicator for the home team), or any other suitable factors. Each key generator 156 takes these inputs and uses a suitable algorithm to generate a key 166 that uniquely identifies the live event. Any suitable algorithm may be used by the key generator. For example, a simple key generator algorithm involves concatenating each of the inputs to the key generator (e.g., start date, start time, etc.) into a single string. With this type of algorithm the resulting string is the unique key.

Figure 10:
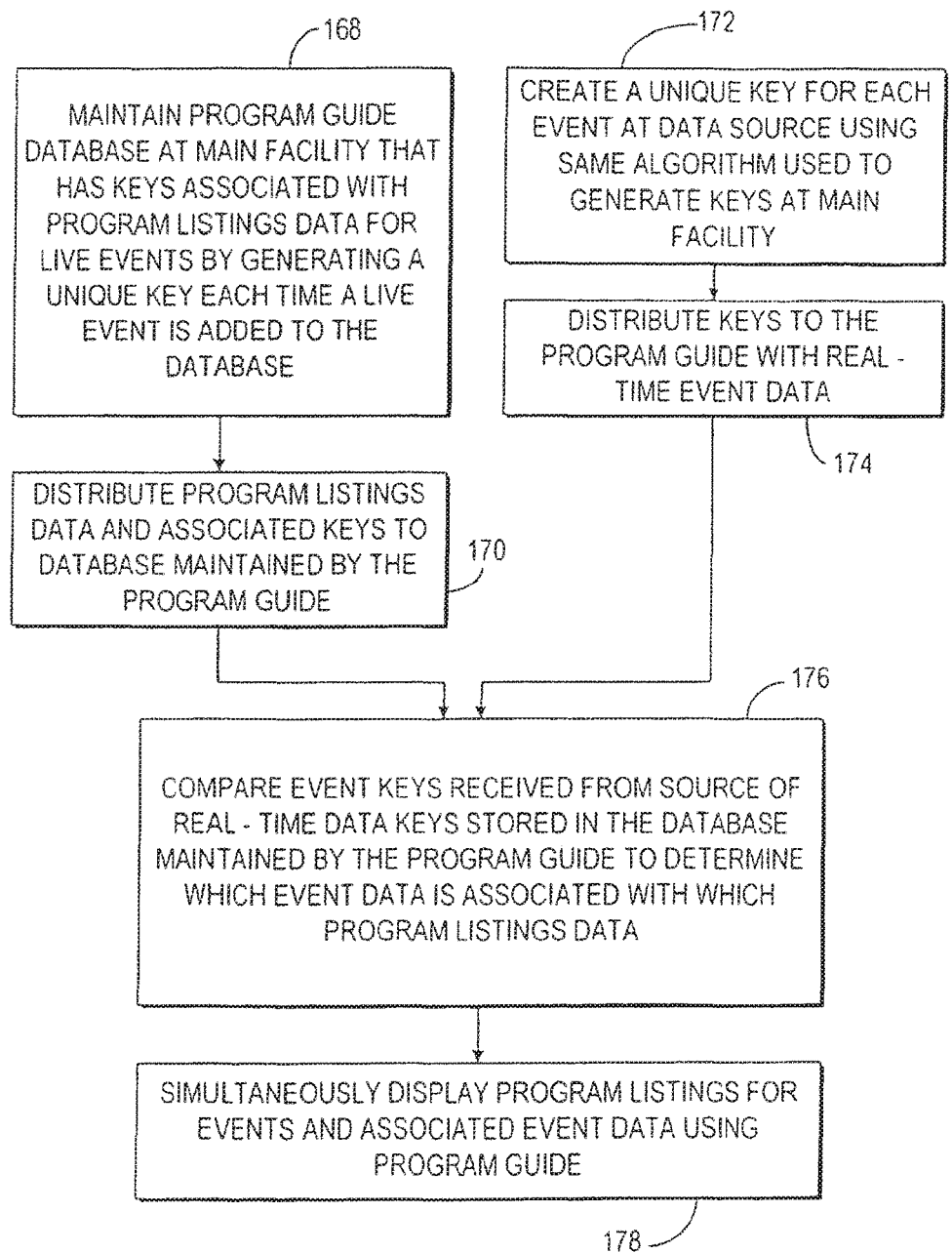
FIG. 10 is a flow chart of steps involved in using the key generator of FIG. 9 to ensure that program listings data is paired with corresponding real-time data in accordance with the present invention.

Steps involved in using the key generators to uniquely identify the program listings and the real-time data for various live events are shown in FIG. 10. At step 168, a first key generator 156 (FIG. 9) is used at main facility 22 in maintaining database 24, so that each program listing stored in database 24 is provided with a unique associated key. Whenever a live event is added to database 24, the first key generator 156 processes information on that event's start date, start time, etc. to generate the unique key. The unique key is stored in database 24 with the associated program listing for the live event. At step 170, the program listings data for the live event and the associated key for that live event are distributed from main facility 22 to the program guide (e.g., they are distributed to the program guide implemented on user television equipment 48 via television distribution facility 26).

At step 172, a second key generator 156 that operates using the same algorithm as the first key generator is used at the source of real-time data (i.e., either at real-time data sources 30 or real-time data collection facility 40) to create a unique key for the real-time data associated with a live event that will match the unique key for the same live event that was generated by the first key generator. At step 174, the real-time data for the live event and the associated unique key are distributed to the program guide (e.g., at television distribution facility 26 or user television equipment 48). Program listings and the keys associated with the program listings are stored in the database maintained by the program guide (e.g., database 53 or database 57). Real-time data and the keys associated with the real-time data may be stored in the database maintained by the program guide if desired to reduce latency and allow access to the real-time data after it has been transmitted.

At step 176, the program guide compares the real-time data events keys received from the source of real-time data with the program listings event keys received from database 24 of main facility 22 to determine which event data is associated with which program listings data. Typically, the program listings keys to which the real-time data keys are being compared at step 176 have been stored in the database maintained by the program guide (e.g., database 53 or database 57). Whenever there is a match between the key for a program listing and the key for some real-time data, it can be concluded that the program listing and the real-time data are for the same live event. The program guide may therefore simultaneously display both the program listing and the associated real-time data for the same event together (e.g., on a program guide display screen such as today's games screen 146 of FIG. 7) at step 178.

The approach of FIG. 10 may be used in situations in which the real-time data updates are for events that have corresponding program listings in database 24. If desired, real-time data updates may also be transmitted for which there is no corresponding television program or program listing in database 24. Such updates may include, for example, updates to news feeds, updates to score information for which there is no televised game, etc. Real-time data for which there is no associated program listing may be distributed using steps 172 and 174 of FIG. 10. In step 176 of FIG. 10 the program guide determines that there is no matching program listing key in the database maintained by the program guide (e.g., database 53 or database 57) (because there is no corresponding program listing). Accordingly, the program guide may display the real-time data for the live event without simultaneously displaying an associated program listing.

Sometimes it may be desirable to update program listings information in the database maintained by the program guide using the data feed for the real-time data provided by real-time data sources 30. For example, a game may be delayed due to changing weather conditions or a game may no longer be blacked out because the game has achieved a certain level of ticket sales. This type of information affects the program listings that are displayed by the program guide. For example, a weather delay affects the scheduled broadcast time for the game in the program listing and a change in a game's blackout status affects whether the game appears in a program listings with an associated channel number. The best way to acquire such updated program listings information may be to use real-time sports data source 32.

Figure 11:
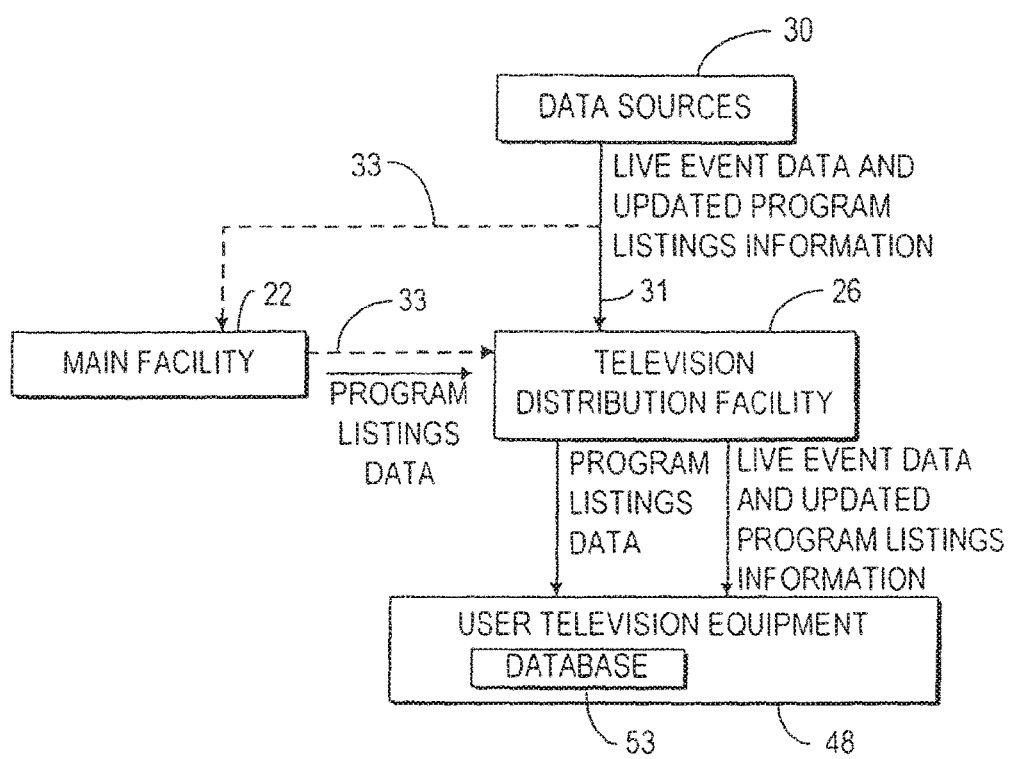
FIG. 11 is a diagram illustrating how program listings information may be provided to the program guide as part of a real-time data feed in accordance with the present invention.

As shown in FIG. 11, in these situations data sources 30 provide live event data and updated program listings information to television distribution facility 26 either directly as shown by solid line 31 or indirectly via main facility 22 as shown by dotted line 33. Television distribution facility 26 also receives program listings data from main facility 22 that has not been updated with information from data sources 30. Television distribution facility 26 provides the program listings data, the live event data, and the updated program listings information to the program guide (e.g., the program guide implemented on user television equipment 48). The program listings data and the updated program listings information is stored by the program guide in the database maintained by the program guide (e.g., database 53). The live event data may also be stored in the database maintained by the program guide if desired. If desired, the program guide may be based on a client-server architecture and the database maintained by the program guide may be located at television distribution facility 26.

Figure 12:
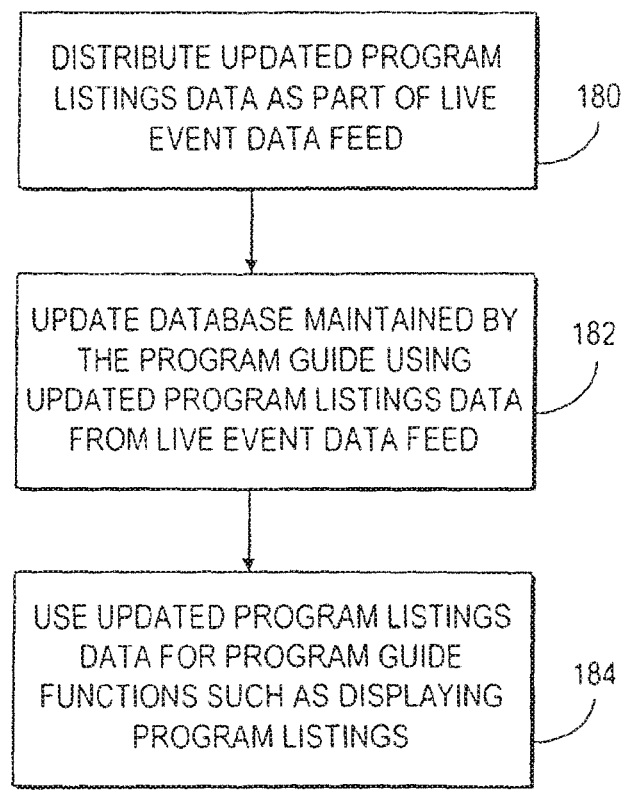
FIG. 12 is a flow chart of steps involved in distributing program listings data to the program guide as part of the real-time data feed in accordance with the present invention.

Steps involved in distributing updated program listings as part of the real-time data distributed from real-time data sources 30 are shown in FIG. 12. At step 180, the updated program listings information is distributed to the program guide as part of the live event data stream. At step 182, the database maintained by the program guide (e.g., database 53 of FIG. 1) is updated using the updated program listings information. At step 184, the program guide uses the updated program listings data for functions such as displaying program listings, scheduling program recordings, setting reminders, allowing the purchase of pay-per-view events, etc.

Figure 13:
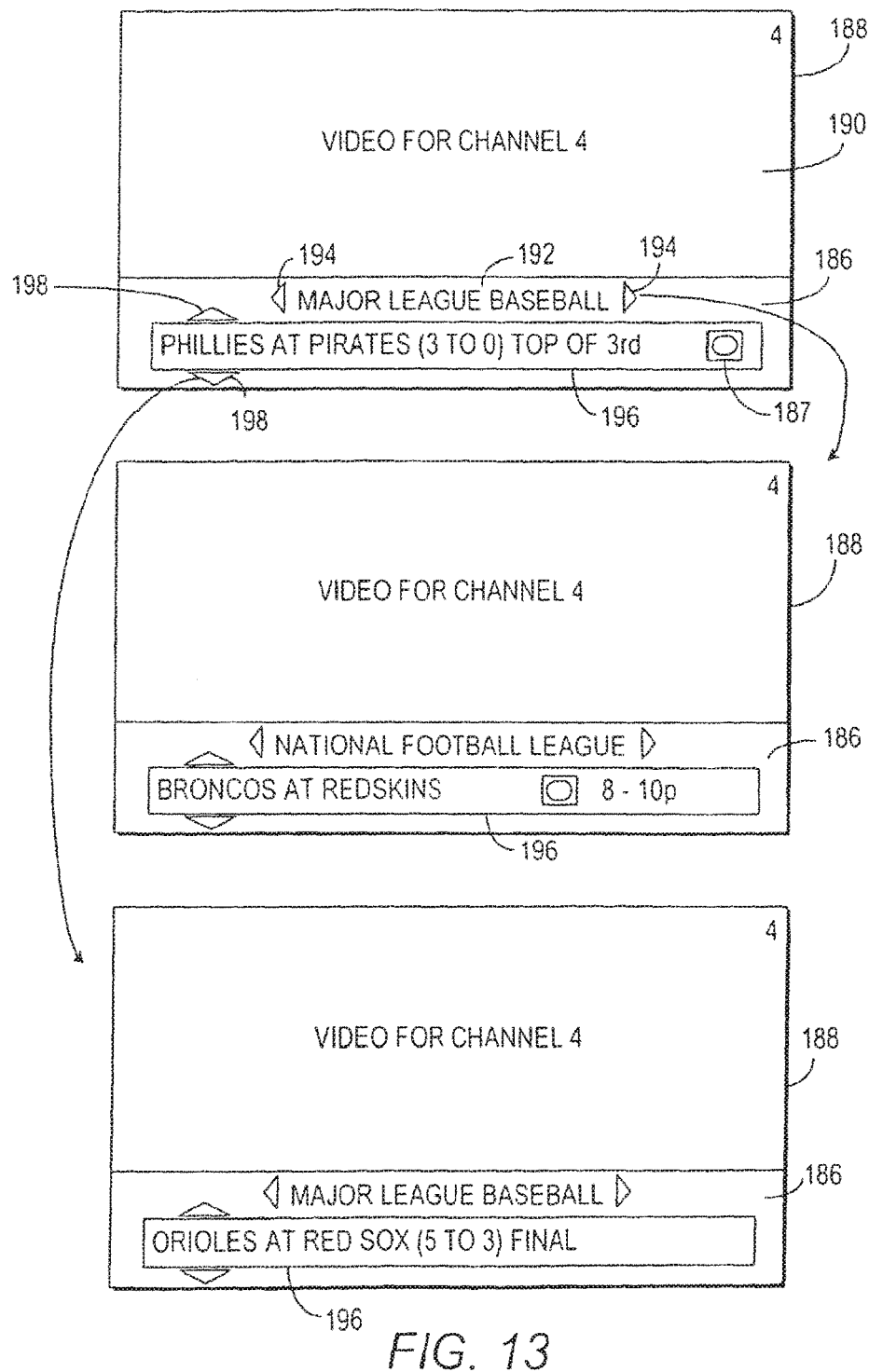
FIG. 13 is a diagram of three user television equipment screens each of which contain an illustrative controllable ticker in accordance with the present invention.

Another aspect of the invention involves displaying a controllable ticker on the user's television screen. As shown in FIG. 13, controllable ticker 186 may be displayed by the program guide on the user's television screen 188 as an overlay on top of a television program 190 (e.g., the program showing on channel 4).

Controllable ticker 186 may contain a selectable category 192 such as major league baseball, National Football League (NFL) football, National Hockey League (NHL) hockey, news, or any other suitable user-defined or predefined category. The user may select from different categories that are available using right and left remote control cursor keys as indicated by arrows 194. For example, if the user is viewing the controllable ticker 186 shown on the top screen 188 of FIG. 13 in which the selected category is "major league baseball," pressing the right cursor key will direct the program guide to present the controllable ticker 186 shown in the center screen 188 of FIG. 13 in which the selected category is National Football League.

Each category 192 has a number of associated items of status information. For example, in the controllable ticker 186 shown in the top screen 188 of FIG. 13, the program guide has displayed status information item 196 (the game title, current score, and current inning, of the Phillies at Pirates game). Status information items for sports-related categories such as status information item 196 contain real-time data such as current score information and game status information. Status information items for other types of categories contain other suitable types of real-time data. For example, status information items associated with the category news may be "stocks," "bonds," "world," "national," or "weather."

An icon such as television icon 187 may be displayed with a status information item such as status information item 196 that corresponds to a program listing for a program or channel that is available on the user's user television equipment. The user may select a status information item that contains a television icon (or other suitable indicator of television program availability) as shown in FIG. 4. This allows the user to record a program, tune to a program or channel, set a reminder for a program, purchase a pay program, or display additional information such as status information or listings information, etc. If desired, certain additional information such as program listings information may be obtained even if the television icon or other indicator is not used.

A user may select from among the various status information items associated with a given category by using up and down remote control cursor keys as indicated by arrows 198. For example, if the program guide is displaying the controllable ticker 186 shown on the upper screen 188 of FIG. 13 and the user presses a down cursor key, the program guide may be directed to display the lower screen 188 of FIG. 13, which contains a controllable ticker 186 in which the next available status information item 196 (information on the Orioles at Red Sox game) is displayed.

Figure 14A:
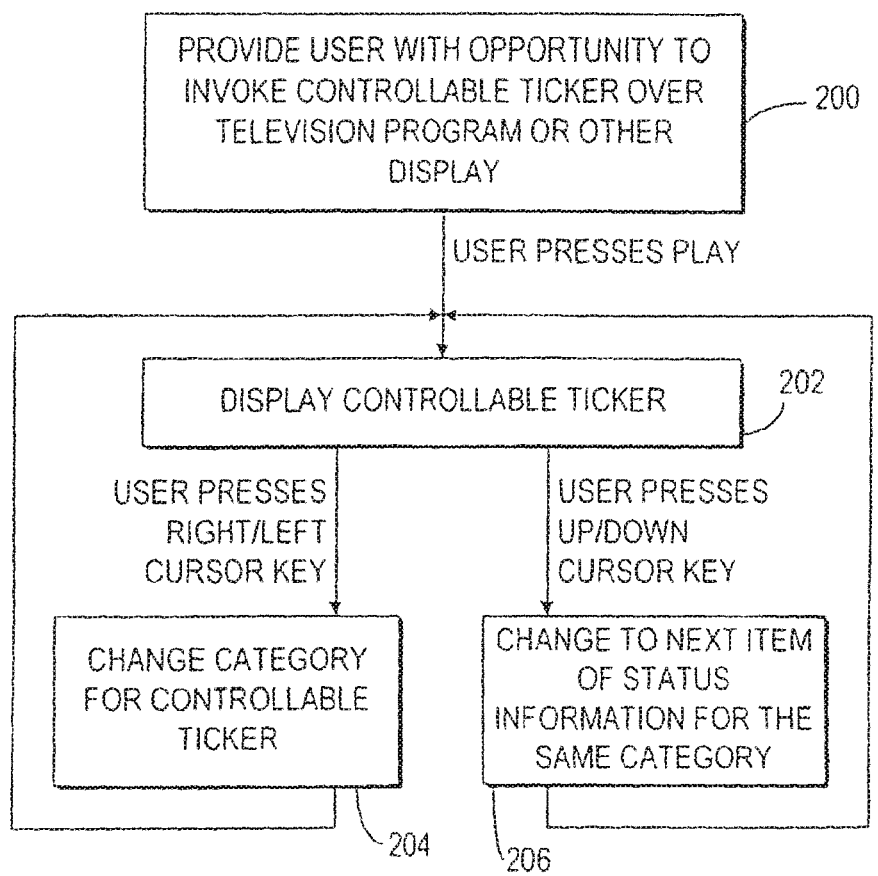
FIG. 14a is a flow chart of steps involved in changing categories and status information items in a controllable ticker such as the controllable ticker of FIG. 13 in accordance with the present invention.
Figure 27A:
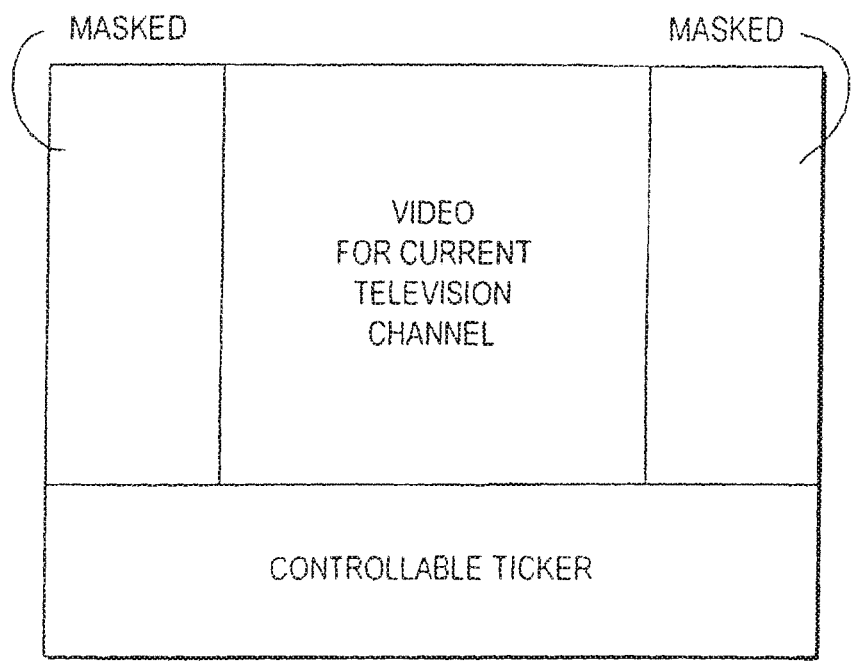
FIGS. 27a, 27b, and 27c are diagrams showing illustrative controllable ticker arrangements in accordance with the present invention.
Figure 27B:
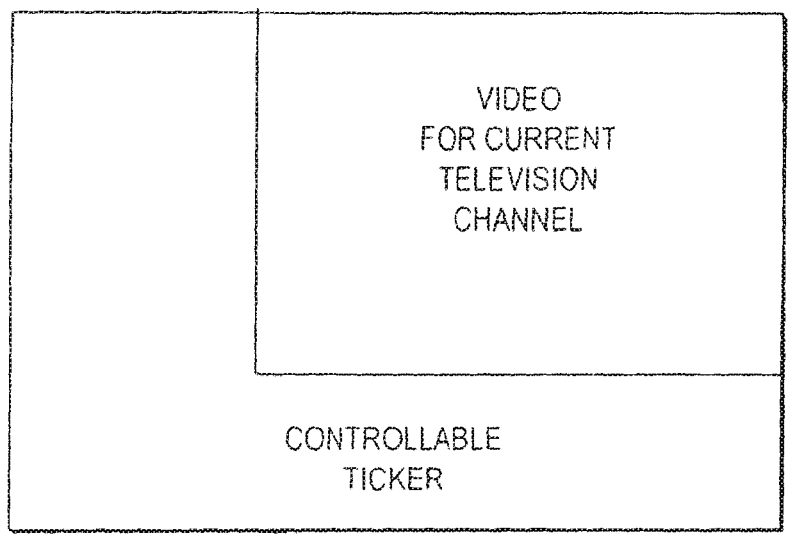
Figure 27C:
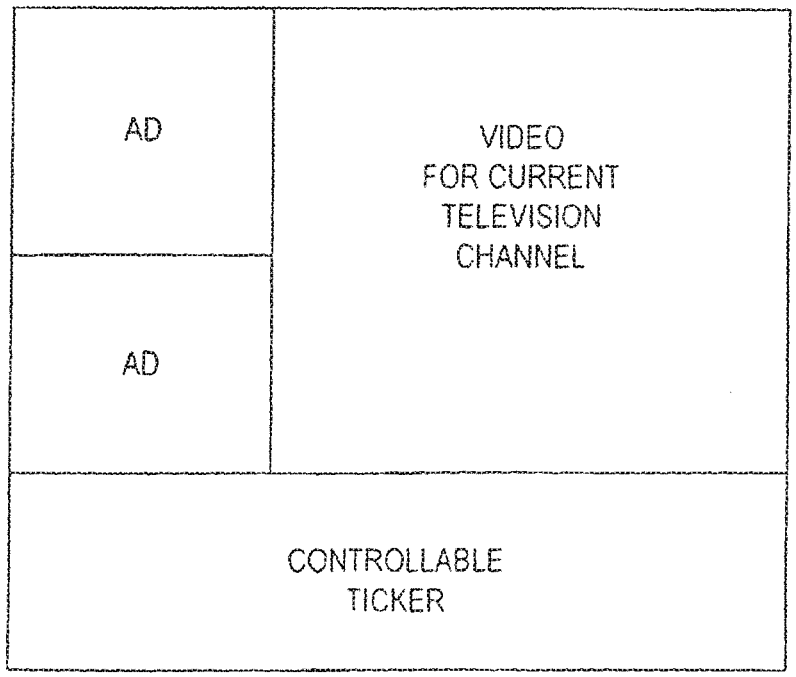

Steps involved in providing the controllable ticker are shown in FIG. 14a. At step 200, the program guide provides the user with an opportunity to invoke the controllable ticker. After the user presses a remote control play key or other suitable button (e.g., to make an on-screen menu selection), the program guide displays the controllable ticker at step 202. If desired, the controllable ticker may be integrated into a program guide browse function and accessed by changing the channel or time displayed in the browse display outside the normal channel or time range. Initially, the most popular category and status information item for that category may be displayed. The controllable ticker may be displayed as an overlay on top of a television program or other currently existing screen. An advantage of providing the controllable ticker as an overlay on top of an existing television program is that it allows the user to continue to listen to and watch the program while the controllable ticker is displayed. If desired, the controllable ticker may be provided as a full screen. The audio of an existing television program may be retained during this display to provide the user with a cue that the program is still being broadcast. Other suitable arrangements are shown in FIGS. 27a, 27b, and 27c. As shown in FIG. 27a, the controllable ticker may be displayed on a portion of the user's television screen while a reduced-size version of the video for the current channel is simultaneously displayed with appropriate masked regions. This allows the aspect ratio of normal television to be preserved for the video portion of the display. As shown in FIG. 27b, the controllable ticker can be displayed in the form of an "L" shape. The space in the vertical portion of the controllable ticker may be used to display statistics, etc. As shown in FIG. 27c, while the controllable ticker is being displayed, the video for the current television channel may be displayed on one portion of the display screen while advertisements are displayed on another portion of the display screen. An advantage of arrangements such as those of FIGS. 27a, 27b, and 27c is that they allow the user to continue to listen to and watch the current television program, just as when the video for the current television program is simultaneously displayed with the controllable ticker by overlaying the controllable ticker on top of the current program. All of these arrangements are merely illustrative. Any suitable arrangement may be used if desired.

If the user presses a left or right remote control cursor key or some other suitable button, the program guide changes the category for the controllable ticker at step 204 of FIG. 14a. The controllable ticker containing the newly selected category is displayed at step 202. If the user presses an up or down remote control cursor key or some other suitable button, the program guide changes the selected status information item to the next status information item in the selected category at step 206. For example, if the category is news and the current status information item is "stock prices," pressing an up or down cursor key may direct the program guide to change to the status information item "weather news" at step 206. The controllable ticker with the newly selected status information item is displayed at step 202.

Figure 14B:
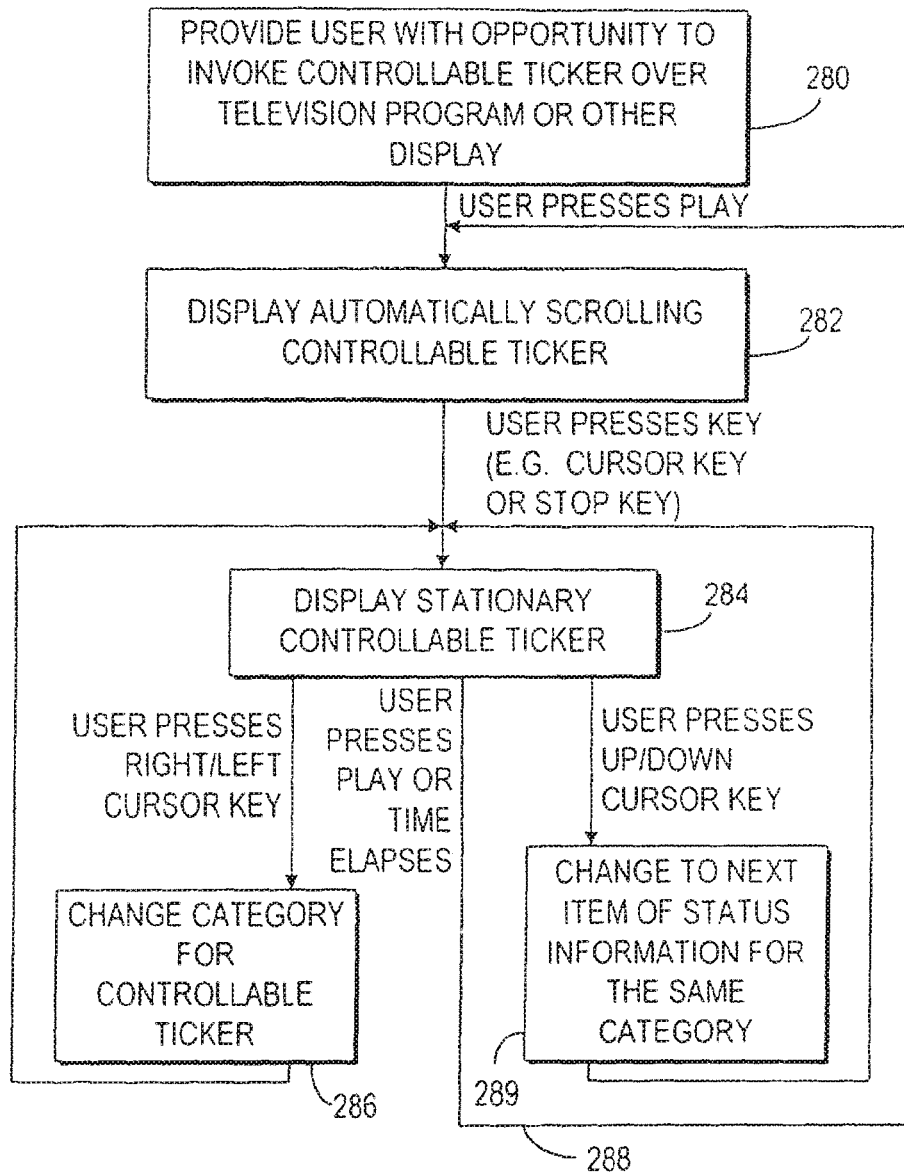
FIG. 14b is a flow chart of steps involved in using an automatically scrolling controllable ticker in accordance with the present invention.

As shown in FIG. 14b, the controllable ticker may be automatically scrolled. With this approach, the program guide provides the user with an opportunity to invoke the controllable ticker at step 280. After the user presses a remote control play key or other suitable button (e.g., to activate an on-screen menu selection), the program guide displays an automatically scrolling controllable ticker at step 282. Either the controllable ticker categories, status information items, or both may be automatically scrolled by the program guide. When the user presses a remote control key such as a cursor or stop key, the program guide stops the scrolling motion of the ticker and displays a corresponding stationary controllable ticker at step 284.

If the user presses a left or right cursor key (for example), the program guide changes the category for the controllable ticker at step 286. If the user presses an up or down cursor key (for example) the program guide changes the status information item to the previous or next such item at step 288. If desired, the scrolling action of the controllable ticker may be resumed after a predetermined amount of time elapses (e.g., 15 seconds) or after the user presses play. As shown by line 288, in these situations the program guide resumes scrolling of the controllable ticker and displays the automatically scrolling controllable ticker at step 282.

The program guide may allow the user to cancel the display of the controllable ticker using any suitable technique. For example, the program guide may provide an opportunity for the user to cancel the display of the controllable ticker whenever the user presses the play key or an exit key as shown at step 208 of FIG. 15. The display of the controllable ticker may also be canceled automatically by the program guide after a predetermined time interval. If desired, the program guide may store the most recently viewed category (and optionally the most recently viewed status information item) when the user exits as shown at step 210. When the user invokes the controllable ticker at a later time, the program guide may display the controllable ticker with the most recently used category at step 212. The status information item displayed at step 212 may be either the first (or other suitable default) status information item associated with the most recently viewed category or may be the most recently viewed status information item for the most recently viewed category.

Figure 15:
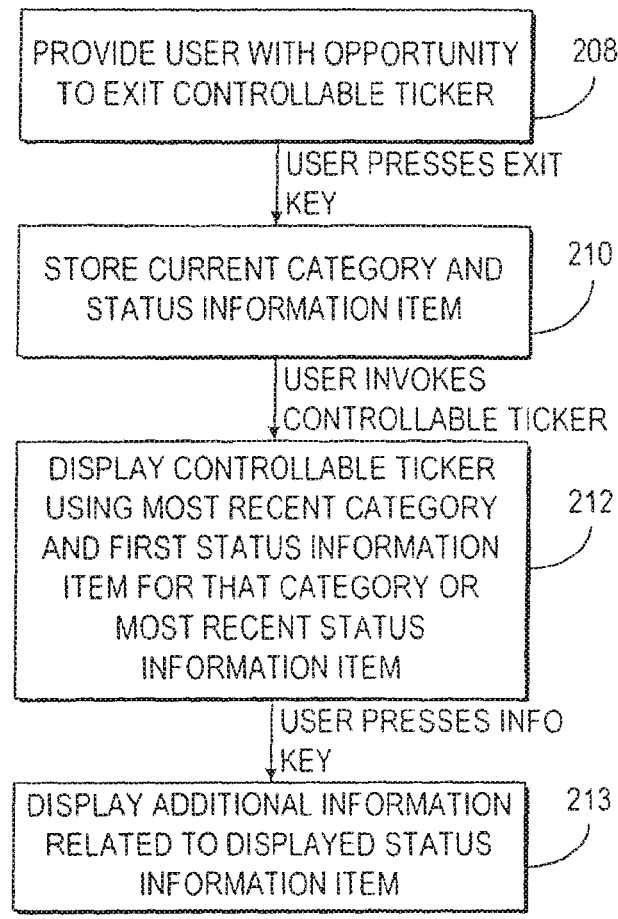
FIG. 15 is a flow chart of steps involved in providing a controllable ticker such as shown in FIG. 13 in accordance with the present invention.

If desired, the user may direct the program guide to display additional information (either from the real-time data source or the program listings database or both) that relates to a displayed status information item. For example, as shown in FIG. 15, the user may press an info key or other suitable remote control button to direct the program guide to display such additional information at step 213. Although shown in FIG. 15 as a step that follows the invoking of the controllable ticker, this is merely illustrative. The additional information display feature of step 213 may be performed at any suitable time at which a given status information item is displayed in the controllable ticker.

Figure 16:
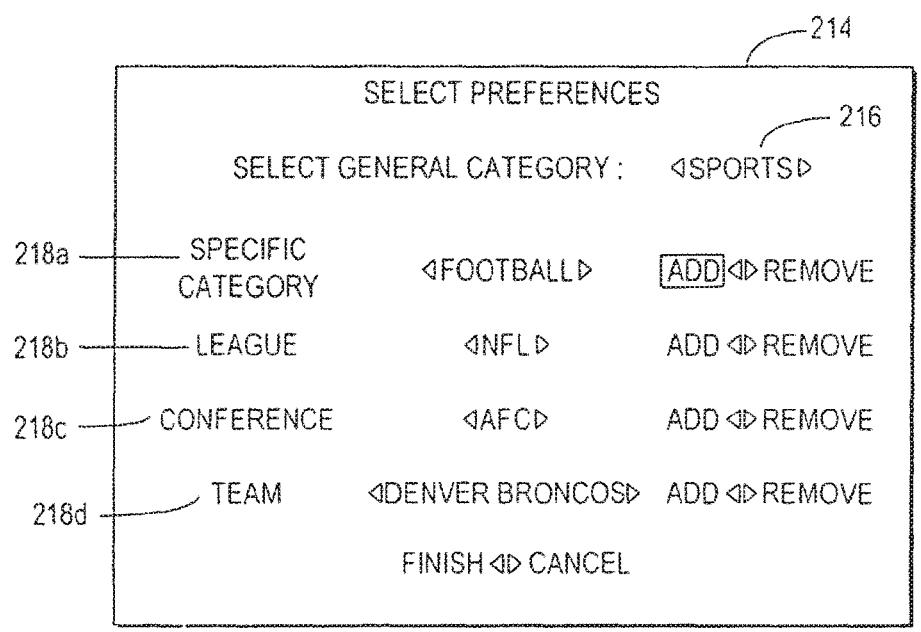
FIG. 16 is an illustrative select preferences screen that may be provided to allow a user to select certain favorite settings in accordance with the present invention.

The user may set up certain preferences for the program guide to use when displaying the controllable ticker. For example, the program guide may provide a screen such as select preferences screen 214 of FIG. 16. Using an interface such as select preferences screen 214, the program guide may provide the user with an opportunity to select one or more general categories such as general category 216 as favorites. The program guide may also provide the user with an opportunity to select various favorite options that depend upon the selection of the favorite general categories. In the example of FIG. 16, the favorite general category selected by the user is sports. Accordingly, the program guide has provided a number of preference selection options 218 related to the sports category. In particular, screen 214 contains an option 218a for the user to select one or more favorite specific sports categories, an option 218b for the user to select one or more favorite leagues, an option 218c for the user to select one or more favorite conferences, and an option 218d for a user to select one or more favorite teams. The user may select one or more favorite teams with each option. The user may select any general categories as favorites and the program guide may provide any suitable set of options related to those categories to be used in setting the user's preferences.

Figure 17:
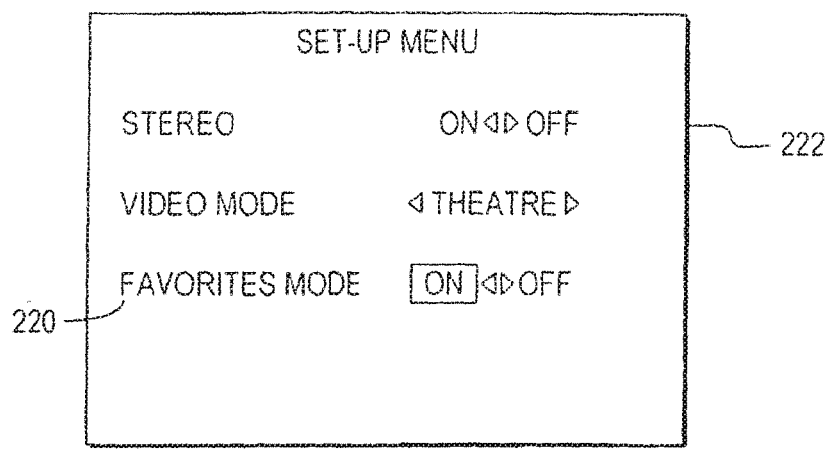
FIG. 17 is an illustrative set-up menu screen that may be provided to allow the user to turn favorites mode on and off in accordance with the present invention.

Once the user's preferences have been selected by the user, the program guide may use the selected preferences in displaying the controllable ticker. This may be accomplished using a number of suitable techniques. For example, the program guide may only display categories in the controllable ticker that are one of the user's selected favorite categories. If desired, the user may turn on or off a "favorites mode" in the program guide using, for example, a favorites mode option 220 in a set-up menu 222, as shown in FIG. 17. When favorites mode is turned on, the only categories displayed by the program guide in the controllable ticker are those that satisfy the user's preferences. When favorites mode is turned off, all categories are displayed.

Figure 18:
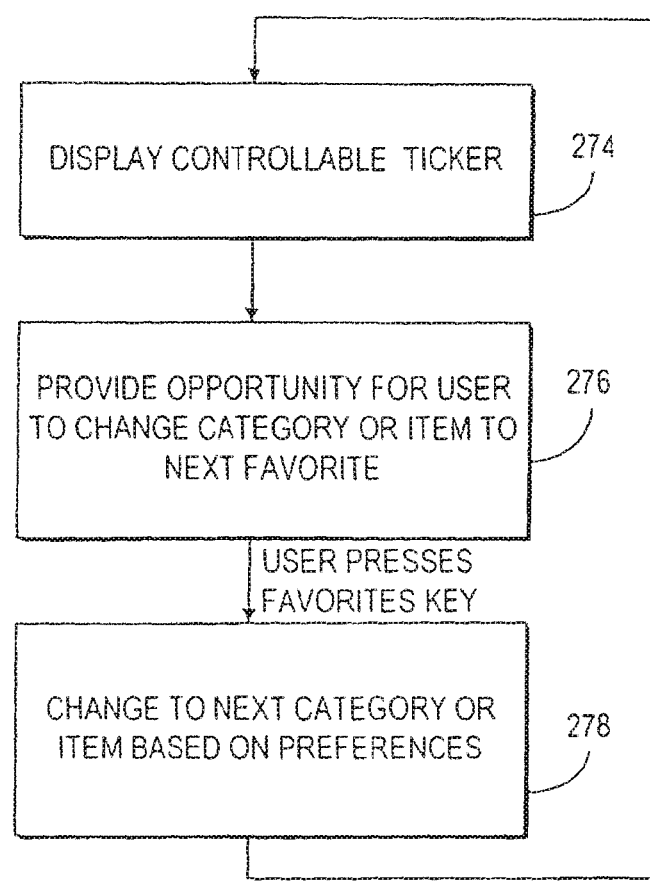
FIG. 18 is a flow chart of steps involved in displaying categories and status information items in the controllable ticker that satisfy the user's preferences by pressing a dedicated favorites button in accordance with the present invention.

Another example involves the use of a remote control favorites key. As shown in FIG. 18, after the program guide has displayed the controllable ticker at step 274, the program guide may provide the user with an opportunity to change to the user's next favorite category or status information item (as defined by the user's preferences that were set up using, e.g., screen 214 of FIG. 16) at step 276. Whenever the user presses a key such as a favorites key, the program guide may change to the next category (or the next status information item or both if desired) that satisfies the user's preferences at step 278.

Figure 19:
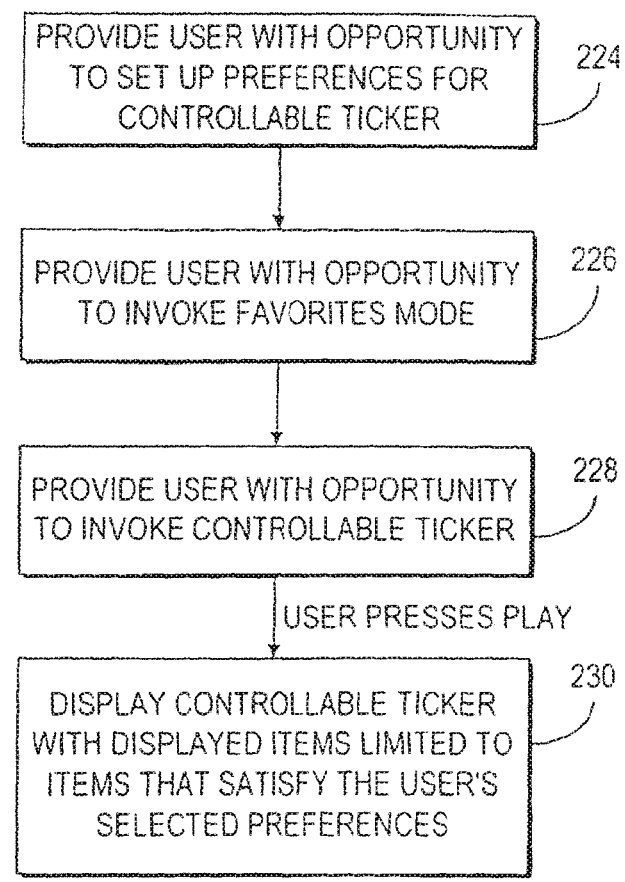
FIG. 19 is a flow chart of steps involved in displaying only those categories and status information items in the controllable ticker that satisfy the user's preferences by invoking a favorites mode in accordance with the present invention.

Steps involved in using the controllable ticker with user-selected preferences are shown in FIG. 19. At step 224, the program guide provides the user with an opportunity to set up preferences for the controllable ticker. Step 224 may be performed using a select preferences screen such as select preferences screen 214 or any other suitable screen or user interface. At step 226, the program guide provides the user with an opportunity to invoke favorites mode. For example, the user may be provided with an opportunity to turn favorites mode on or off using a set-up screen such as set-up menu screen 222 of FIG. 17 or other suitable user interface (e.g., a dedicated button for toggling favorites mode on or off, etc.). At step 228, the program guide provides the user with an opportunity to invoke the controllable ticker. For example, the program guide may invoke the controllable ticker whenever the user presses an appropriate remote control button (e.g., the play button) or makes a menu selection requesting that the controllable ticker be displayed. At step 230, the program guide displays the controllable ticker on user television equipment 48 (e.g., on the screen of television 58). If the favorites mode is on, the program guide displays the controllable ticker with the categories (and optionally items) that satisfy the user's selected preferences. If the favorites mode is off, all categories may be displayed. The user may access the displayed favorite categories by pressing a favorites button or using some other suitable user interface.

The different types of real-time data provided to the program guide from real-time sources 30 are useful for different periods of time. For example, notes on a particular sports team may be of interest for several days, whereas current score information may only be of interest for a few minutes. In order to avoid cluttering the database maintained by the program guide (e.g., database 53 or database 57), the program guide may purge the database maintained by the program guide to remove data that is outdated and thus no longer useful.

A different expiration time may be assigned to each item of real-time data. After an item of data has expired (as determined by its expiration time), the program guide may remove that data from the database maintained by the program guide. For example, the expiration time for a score update may be the time of the score update plus 10 minutes. When the program guide determines that more than 10 minutes have elapsed since the score update, that score update may be removed from the database.

A roll-over time may be used to establish a time of day (or time of day and day of the week, etc.) at which certain information may be cleared out of the database. The roll-over time may be any suitable time, such as 7:00 AM Eastern Standard Time. Certain data types may expire at the rollover time. Illustrative expiration times for various different types of data are shown in the table of FIG. 20.

Figure 21:
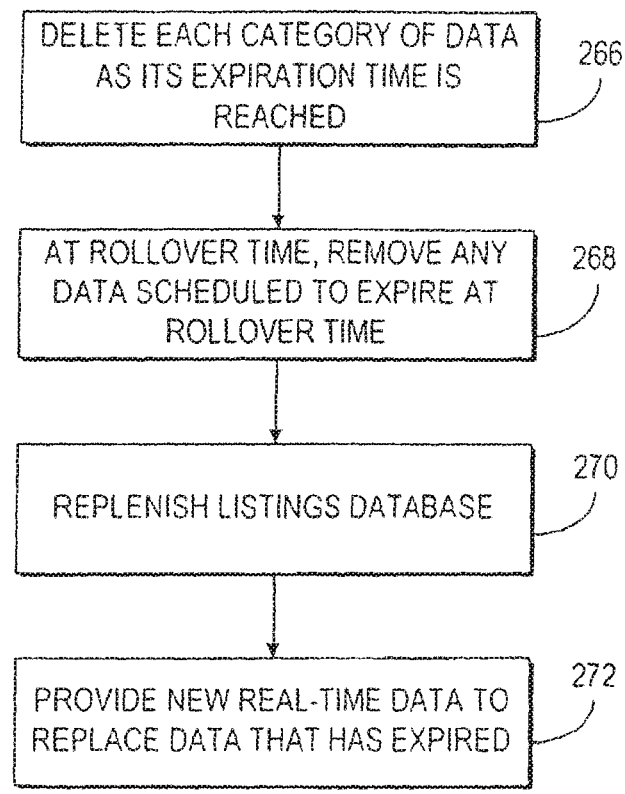
FIG. 21 is a flow chart of steps involved in removing expired real-time data from the database maintained by the program guide in accordance with the present invention.

Steps involved in maintaining the database using expiration times such as the illustrative expiration times of FIG. 20 are shown in FIG. 21. At step 266, the program guide deletes each category of data from the database as its expiration time is reached. At step 268, the program guide removes substantially all information from the database that is related to completed games at the rollover time. At step 270, the program guide replenishes the database with fresh program listings data. At step 272, the program guide stores new real-time data that has been provided to the program guide in the database to replace the data that has expired.

Figure 22:
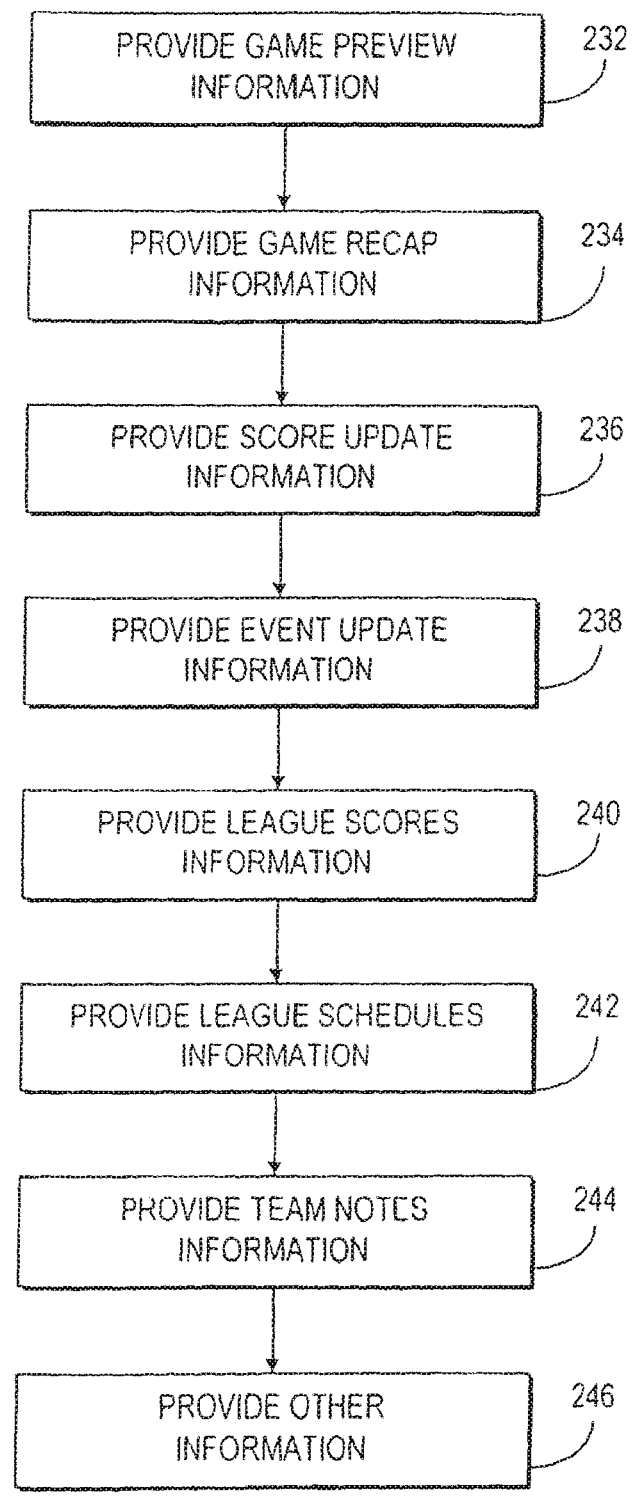
FIG. 22 is a flow chart of steps involved in providing various types of real-time data to the user television equipment in accordance with the present invention.
Figure 23:
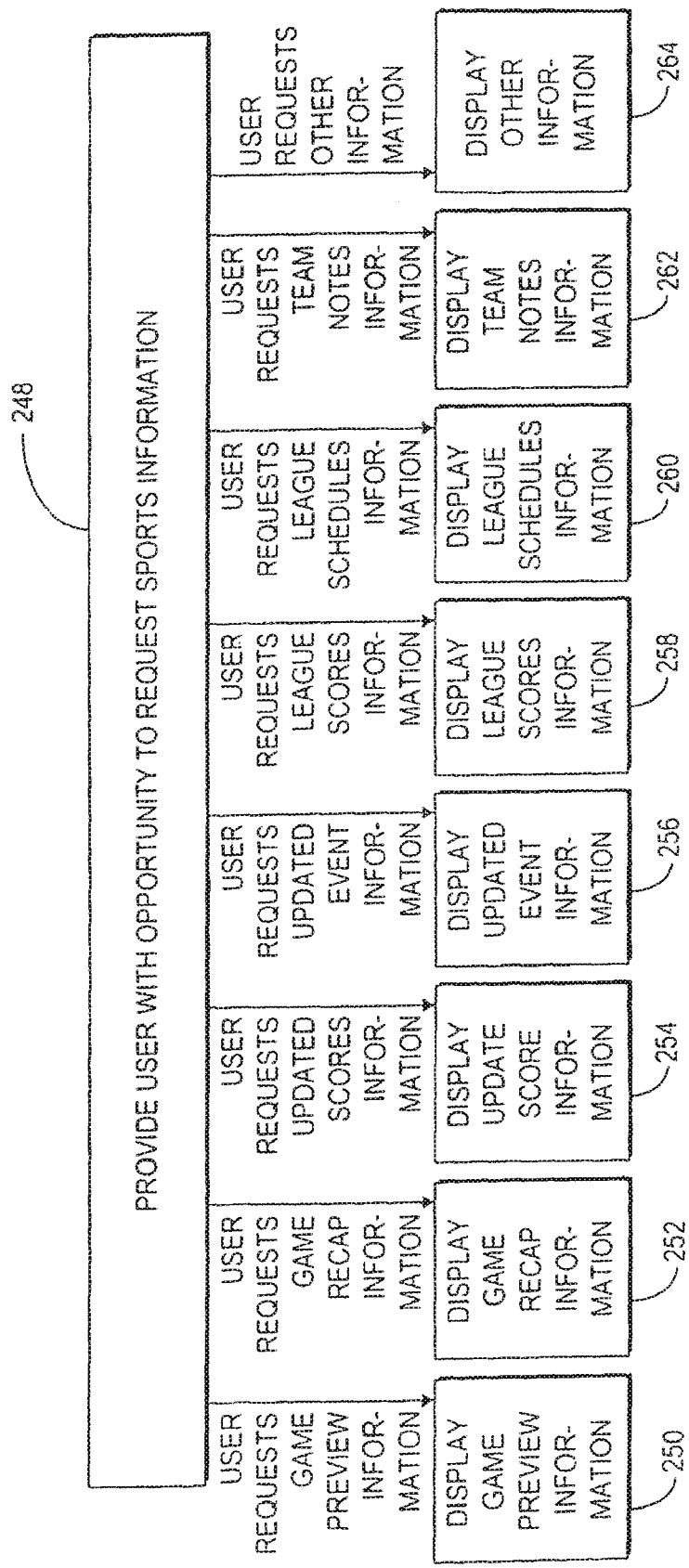
FIG. 23 is a flow chart of steps involved in displaying different types of real-time data on the user television equipment in accordance with the present invention.

Steps involved in providing various types of real-time data to the program guide are shown in FIG. 22. The data provided in the example of FIG. 22 and related FIGS. 20, 21, and 23 is related to sports. However, this is only illustrative. Data management for other types of real-time data such as news, financial information, weather, etc. may be handled by the program guide in the same way.

As shown in FIG. 22, at step 232 game preview information may be provided to the program guide. Game preview information may be information that is of interest before a game is played, such as general statistical information, facts about the venue, etc. At step 234, game recap information may be provided to the program guide. Game recap information may include game highlights or any other suitable game summary information. At step 236, score update information may be provided to the program guide. Score update information is typically the most recent score for a given game. At step 238, event update information may be provided to the program guide. Event update information may include, for example, changes to the currently scheduled game time due to a weather delay. At step 240, league scores information may be provided to the program guide. At step 244, the program guide may be provided with team notes, which may be any suitable information on the team, such as information on team statistics, individual statistics, information in injuries, etc. At step 246, the program guide implemented on user television equipment 48 may be provided with other suitable sports-related real-time information from real-time data sources 30. The order of the steps shown in FIG. 22 is illustrative. The steps or any suitable subset of the steps may be performed in any suitable order and may be performed concurrently if desired.

Steps involved in displaying the illustrative types of sports-related real-time data provided to the program guide in FIG. 22 are shown in FIG. 23. At step 248, the program guide provides the user with an opportunity to request sports information in the program guide. Requests may be made, for example, by pressing an appropriate remote control button or by responding to a menu option on a suitable program guide screen. If the user requests game preview information, the program guide may display the game preview information at step 250. If the user requests game recap information, the program guide may display the requested recap information at step 252. If the user requests updated score information (e.g., by invoking the controllable ticker or a program guide screen containing program listings and corresponding score information) the program guide may display the updated score information at step 254. If the user requests updated event information, the program guide may display updated event information at step 256. If the user requests league scores information, the program guide may display league scores information at step 258. If the user requests league schedule information, the program guide may display league schedule information at step 260. If the user requests team notes information, the program guide may display team notes information at step 262. If the user requests that the program guide display some other type of information, the program guide may display such information at step 264. The user may request any of these types of information by displaying a program listings screen, a controllable ticker, or a program information screen with the program guide.

Figure 24:
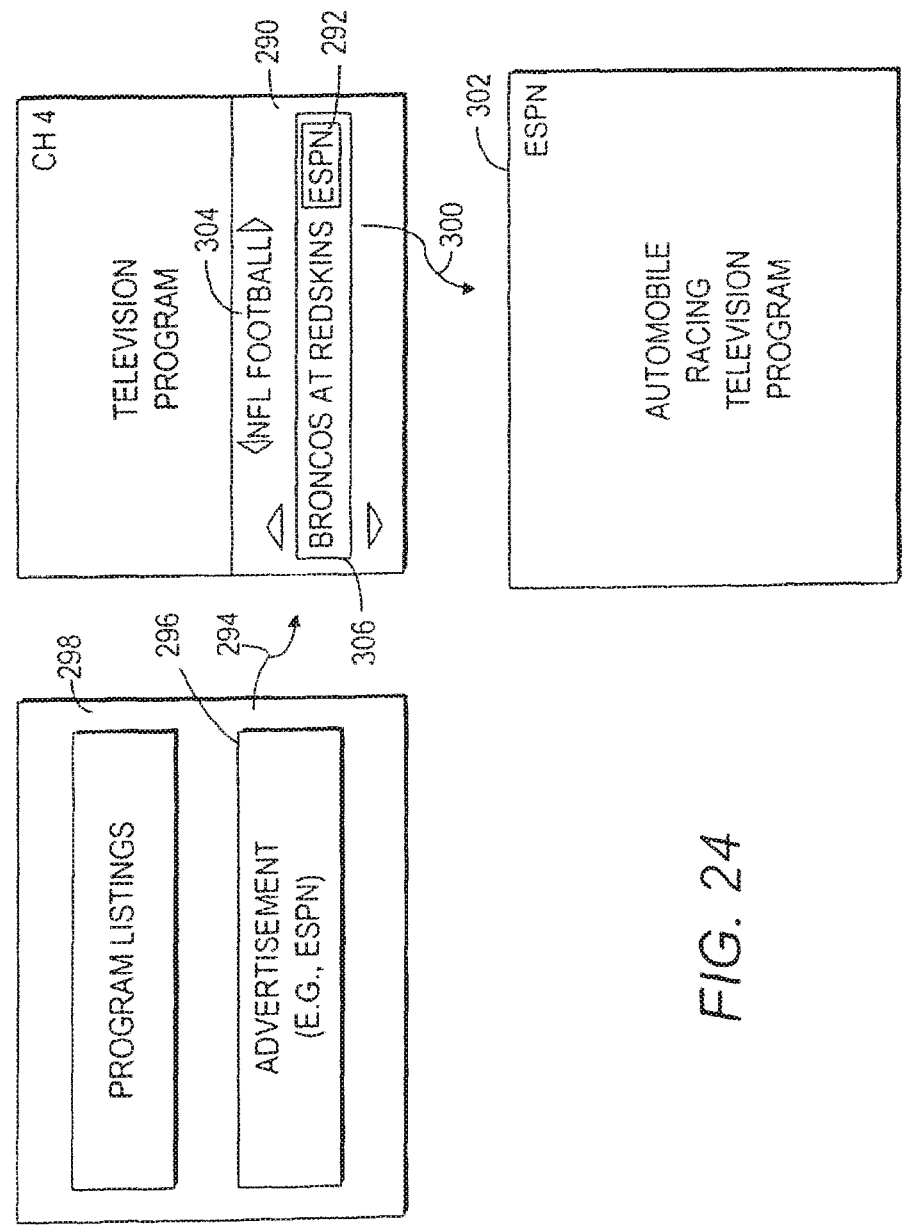
FIG. 24 is a diagram showing how a controllable ticker may be sponsored in accordance with the present invention.

As shown in FIG. 24, a controllable ticker such as the controllable ticker of FIG. 13 may be sponsored by a company. Controllable ticker 290 may be provided with a logo 292 for the sponsoring company. In the example of FIG. 24, logo 292 is displayed in place of a television logo because there is no television program available for the displayed status information item (Broncos at Redskins). The presence of logo 292 may indicate that links are available to the services (channels, advertisements, etc.) of the sponsor. If desired, logos may be displayed elsewhere on controllable ticker 290 or elsewhere on the user's television screen. Links to and from the controllable ticker may be provided to cross-promote various aspects of the sponsor's services. Link 294 is an example of a link to controllable ticker 290 from advertisement 296 for the sponsor that appears on program guide display screen 298. when the user selects advertisement 296 (e.g., using a remote control), the program guide displays controllable ticker 290 on the user's display screen. Controllable ticker 290 may be displayed as an overlay on the current television channel (channel 4 in the example of FIG. 24). Link 300 is an example of a link away from controllable ticker 290. Because the sponsor ESPN in the example of FIG. 24 has an associated TV channel 302, link 300 may be used to take the user to that channel when the user selects (for example) logo 292. The current television program on the ESPN channel 302 need not be related to category 304 or status information item 306 of controllable ticker 290. The links shown in FIG. 24 are merely illustrative. Links may be provided to and from any suitable service of the sponsor (e.g., advertisements, information pages, television channels, web pages, etc.). Moreover, the type of sponsor (a sponsor with a TV channel) used for the example of FIG. 29 is merely illustrative. Any suitable entity may sponsor controllable ticker 290, even if that entity does not have its own television channel.

Figure 25:
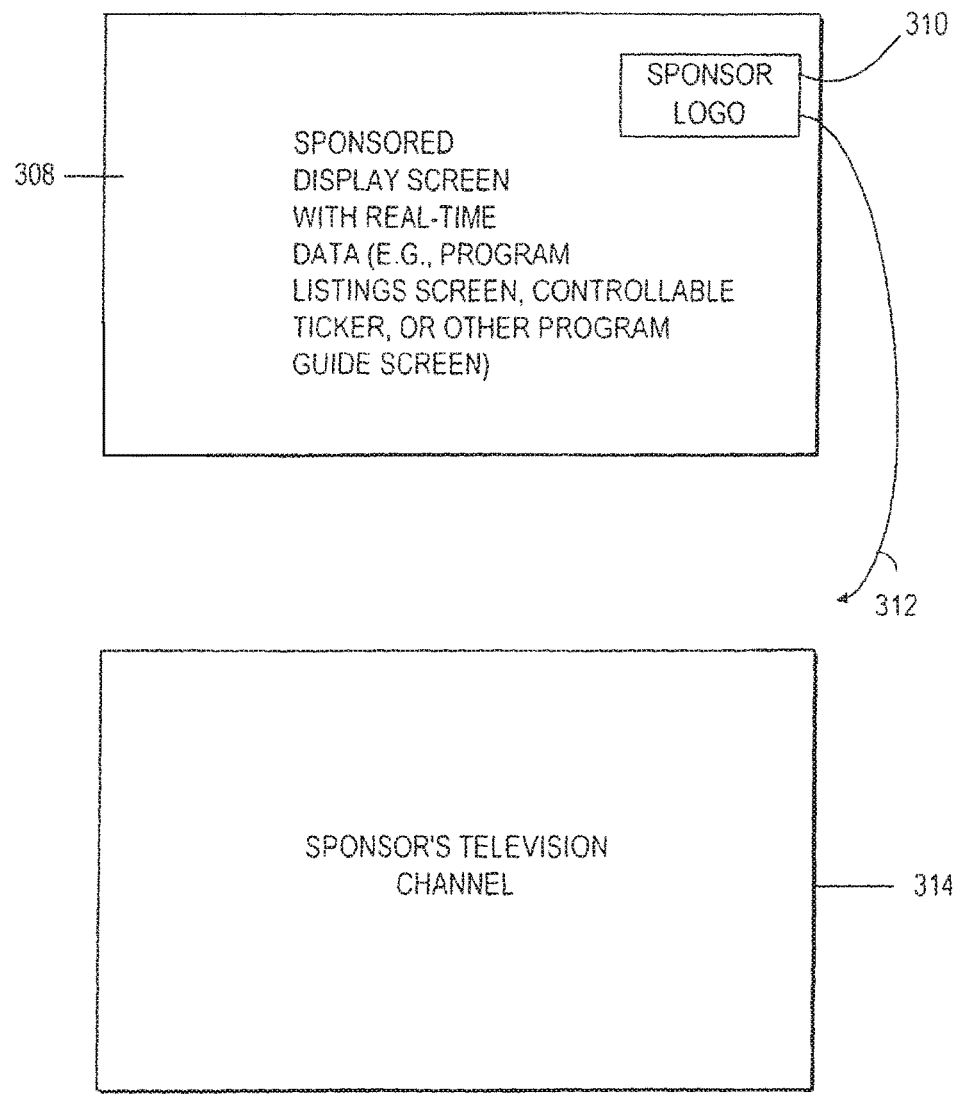
FIG. 25 is a diagram showing how a display screen with real-time data may be sponsored in accordance with the present invention.

In addition, any suitable type of display containing real-time data may be sponsored, not just displays such as controllable ticker 290. As shown in FIG. 25, such a sponsored display screen 308 may use a logo such as logo 310 or other suitable indicator as the basis of a link 312 to the sponsor's service (e.g., sponsor's television channel 314). If a logo is used as the basis of a link, the user may access the link by, for example, maneuvering a highlight region to the logo and pressing a select or enter remote control button. The sponsor's link may also be accessed by pressing a dedicated remote control key or by selecting a suitable on-screen menu option.

Figure 26:
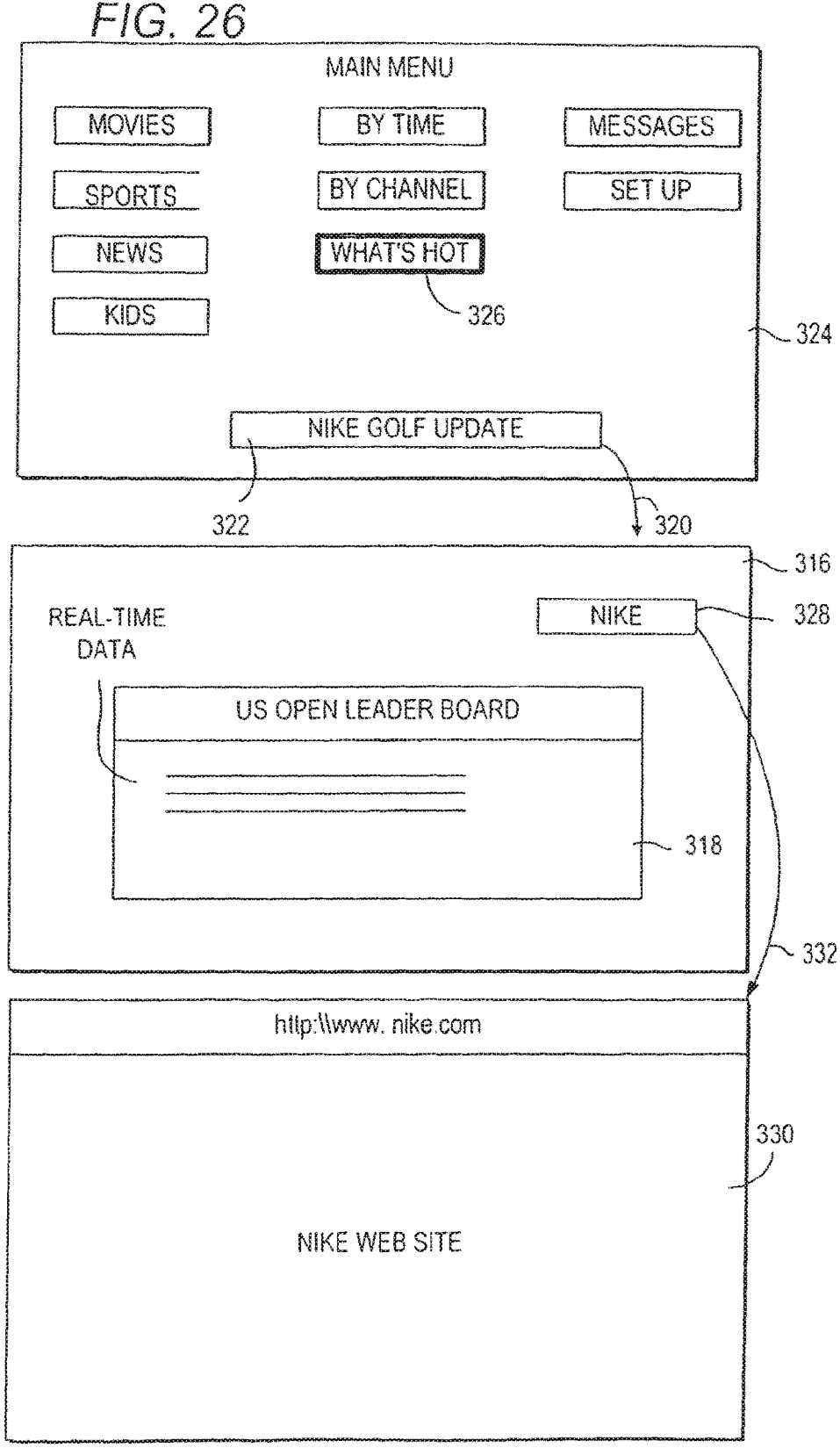
FIG. 26 is a diagram showing illustrative links to and from an illustrative sponsored display screen containing real-time data in accordance with the present invention.

Another illustrative example of a sponsored program guide display screen with real-time data is shown in FIG. 26. The sponsored program guide display screen with real-time data that is shown in FIG. 26 is display screen 316. display screen 316 contains real-time data 318 on the U.S. Open golf tournament. Display screen 316 is sponsored by the company Nike, which sells sports-related products. The user may reach display screen 316 by accessing link 320 from an advertisement or notice such as advertisement 322 on program guide display screen 324 by placing highlight region 326 on advertisement 322. If the user selects Nike logo 328 of screen 316, the program guide invokes a web browser or otherwise provides the user with web access and directs the user to the Nike web site 330, as shown by link 332.

The foregoing is merely illustrative of the principles of this invention and various modifications can be made by those skilled in the art without departing from the scope and spirit of the invention.

What is claimed is:

1. A method for computing and distributing a unique key corresponding to an event, the method comprising:
receiving, at a media guide database, a start date, a start time, and a category of an event, associated with the event;
computing, using a key generator, a first unique key based on the start date, the start time, and the category of the event associated with the event;
storing, in the media guide database, the first unique key and an identifier for the event;
transmitting, via a server, the first unique key and the identifier for the event to a user equipment;
receiving, at the user equipment, a selection of the identifier for the event; and
responsive to receiving the selection, generating for display, at the user equipment, the event and additional information corresponding to the event based on the first unique key, wherein the additional information is retrieved from an additional database, wherein the additional database computes a second unique key for the additional information corresponding to the event and compares the second unique key to the first unique key to provide the additional information.

2. The method of claim 1, wherein the first unique key uniquely identifies the event.

3. The method of claim 1, wherein computing the first unique key using the key generator comprises concatenating the start date, the start time, and the category of the event into a single string.

4. The method of claim 1, wherein the event is a live event and wherein the identifier for the event is a program listing for the live event.

5. The method of claim 1, wherein the first unique key and the second unique key are computed using the same algorithm.

6. The method of claim 1, further comprising:
transmitting, via the server, the additional information corresponding to the event to the user equipment.

7. The method of claim 1, further comprising:
receiving supplementary data which is not associated with any event; and
generating for display, at the user equipment, the supplementary data independently of the event.

8. The method of claim 1, wherein the additional information is generated for display as an overlay.

9. A system for computing and distributing a unique key corresponding to an event, the system comprising:
a media guide database configured to:
receive a start date, a start time, and a category of an event, associated with the event;
store a first unique key and an identifier for the event; and
transmit, via a server, the first unique key and the identifier for the event to a user equipment; and
a key generator configured to compute the first unique key based on the start date, the start time, and the category of the event, associated with the event, wherein responsive to receiving a user selection of the identifier for the event, the event and the additional information corresponding to the event are generated for display based on the first unique key, wherein the additional information is retrieved from an additional database, wherein the additional database computes a second unique key for the additional information corresponding to the event and compares the second unique key to the first unique key to provide the additional information.

10. The system of claim 9, wherein the first unique key uniquely identifies the event.

11. The system of claim 9, wherein the key generator is further configured to compute the first unique key by concatenating the start date, the start time, and the category of the event into a single string.

12. The system of claim 9, wherein the event is a live event and wherein the identifier for the event is a program listing for the live event.

13. The system of claim 9, wherein the key generator is a first key generator, further comprising:
   a second key generator configured to compute the second unique key for the additional information corresponding to the event.

14. The system of claim 9, wherein the first unique key and the second unique key are computed using the same algorithm.

15. The system of claim 9, wherein the additional information corresponding to the event is transmitted, via the server, to the user equipment.

16. The system of claim 9, wherein responsive to receiving supplementary data which is not associated with any event, the supplementary data is generated for display independently of the event.

17. The system of claim 9, wherein the additional information is generated for display as an overlay.

\* \* \* \* \*